(12) United States Patent
Ishikawa

(10) Patent No.: US 6,169,798 B1
(45) Date of Patent: Jan. 2, 2001

(54) SYSTEM AND METHOD FOR AUTOMATIC CALL

(75) Inventor: Yoshio Ishikawa, Kawasaki (JP)

(73) Assignee: Fujitsu Limited, Kawasaki (JP)

(*) Notice: Under 35 U.S.C. 154(b), the term of this patent shall be extended for 0 days.

(21) Appl. No.: 09/168,423

(22) Filed: Oct. 8, 1998

(30) Foreign Application Priority Data

Jan. 27, 1998 (JP) .................................. 10-013823

(51) Int. Cl.7 ..................................................... H04M 3/00
(52) U.S. Cl. ............................................ 379/265; 379/266
(58) Field of Search .................................. 379/265, 266, 379/309, 216, 201, 207

(56) References Cited

U.S. PATENT DOCUMENTS

| | | | |
|---|---|---|---|
| 5,463,685 | * 10/1995 | Gaechter et al. | 379/265 X |
| 5,519,773 | * 5/1996 | Dumas et al. | 379/266 X |
| 5,553,133 | * 9/1996 | Perkins | 379/266 X |
| 5,822,400 | * 10/1998 | Smith | 379/266 X |
| 5,946,386 | * 8/1999 | Rogers et al. | 379/265 |
| 5,991,393 | * 11/1999 | Kamen | 379/266 X |
| 5,999,617 | * 12/1999 | Oyanagi et al. | 379/266 X |

FOREIGN PATENT DOCUMENTS 2-26455 7/1990 (JP).
3-186049 8/1991 (JP).

* cited by examiner

Primary Examiner—Creighton Smith
(74) Attorney, Agent, or Firm—Helfgott & Karas, P.C.

(57) ABSTRACT

An automatic call system including a storage device, a private branch exchange, an originating equipment, and a plurality of operator apparatuses, wherein the private branch exchange originates a call in response to an instruction for call origination from the originating equipment and notifies the call information relating to the originating call to the originating equipment and the destination operator apparatus; the originating equipment stores the called subscriber ID information such as customer telephone numbers in the storage device linked with the call information; and, when a response from a called subscriber is transferred to the operator apparatus, the destination operator apparatus retrieves the called subscriber ID information from the storage device by using the call information as a key, obtains the individual information of the called subscriber, and displays this to the operator.

9 Claims, 21 Drawing Sheets

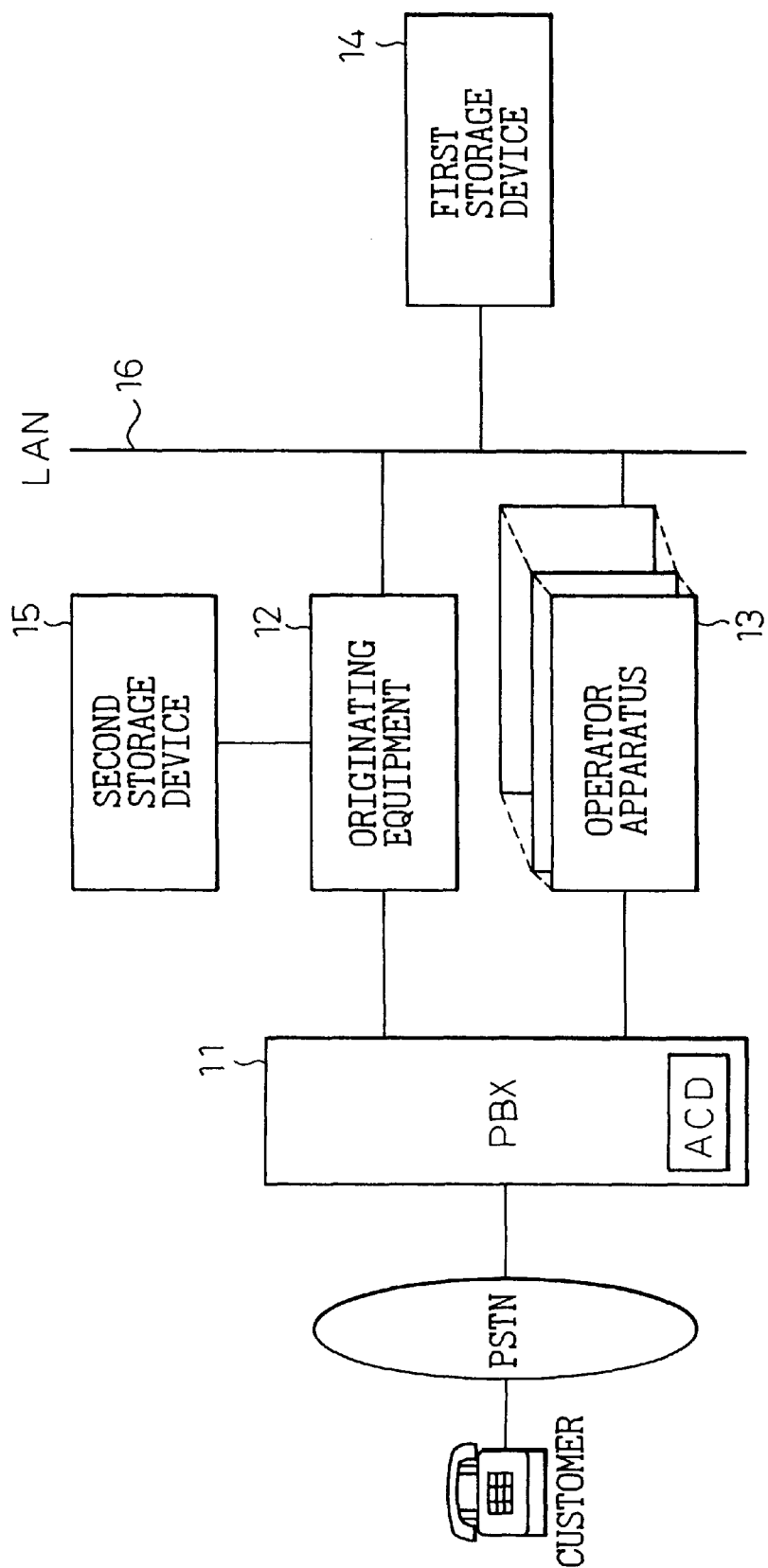

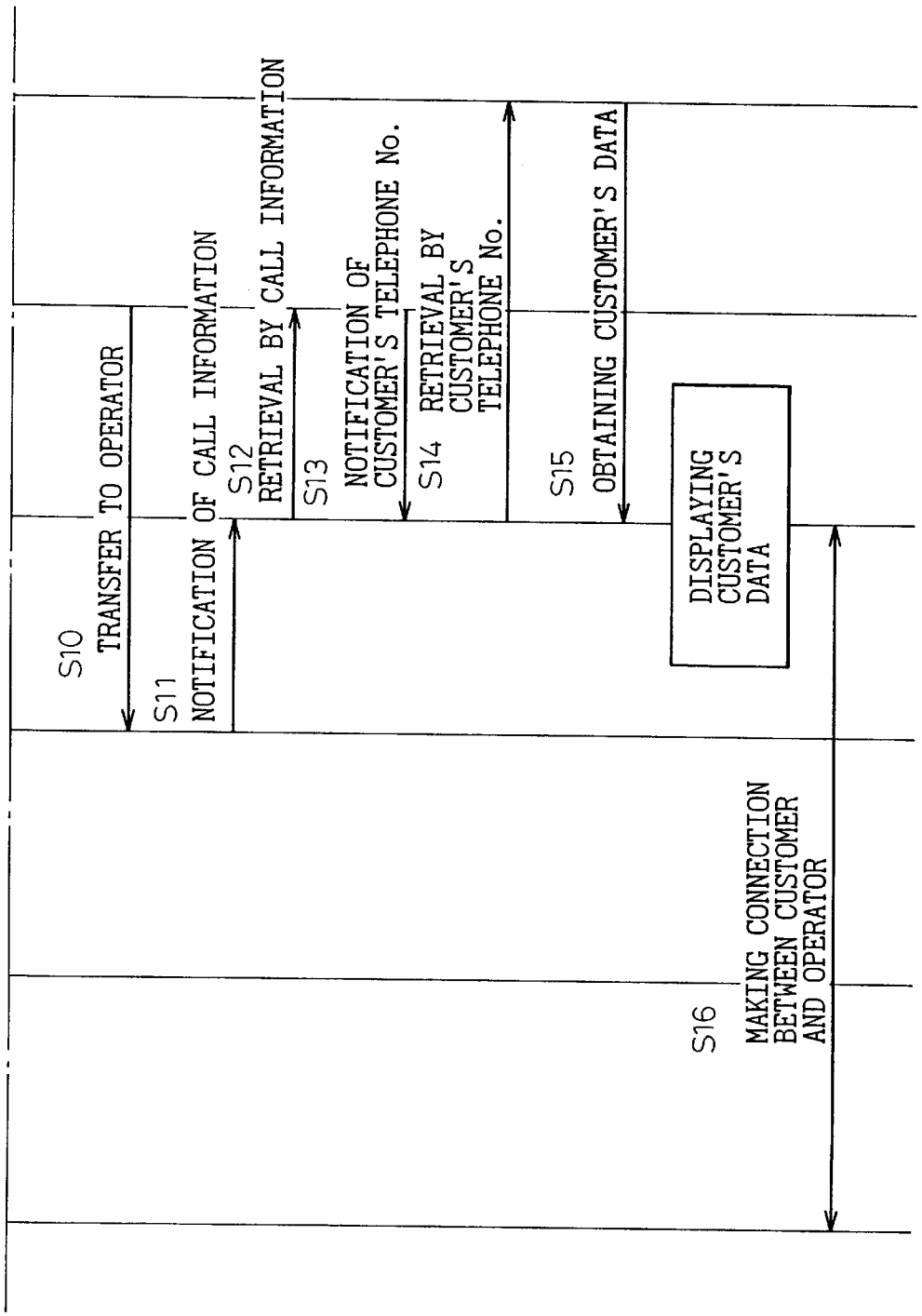

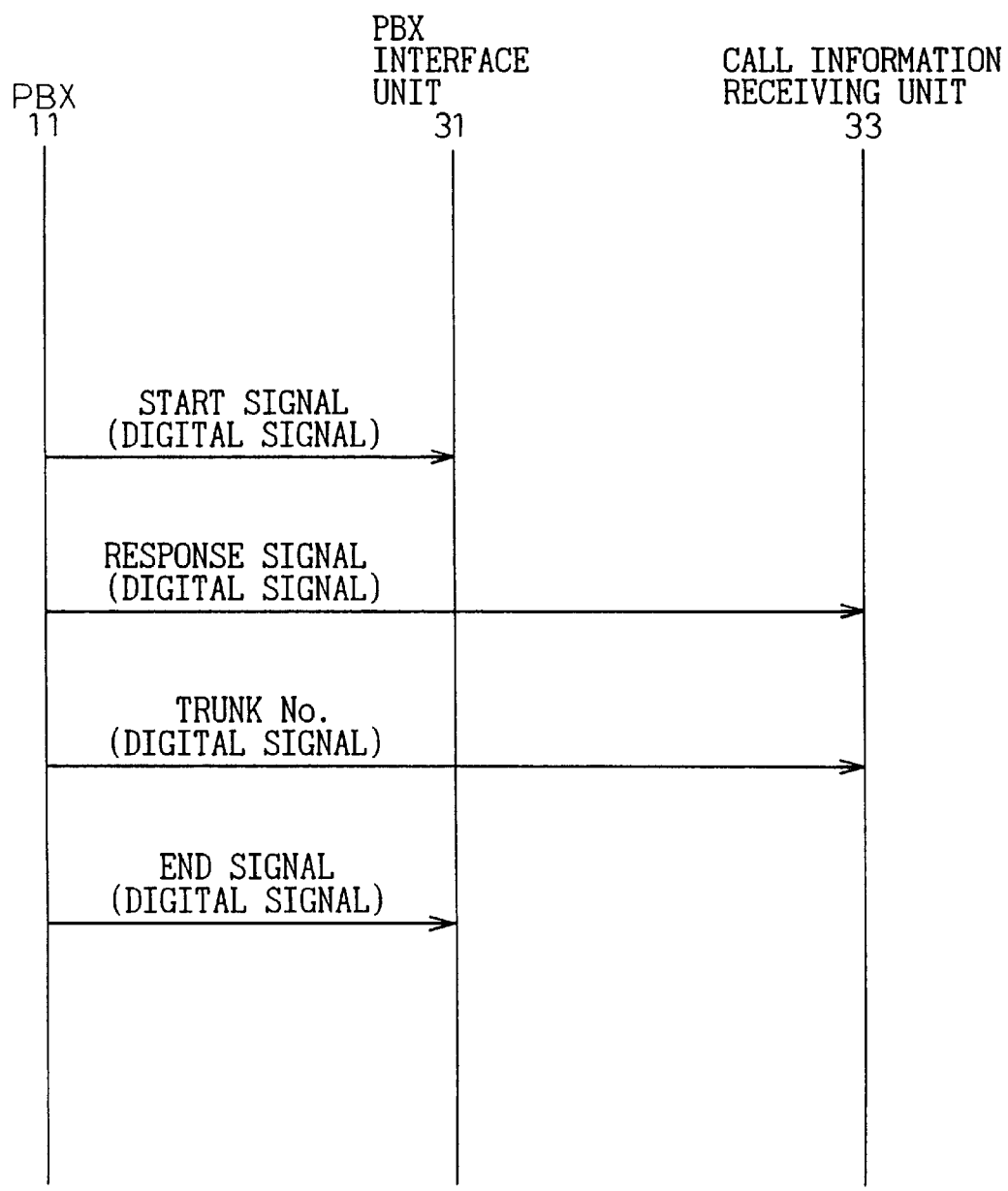

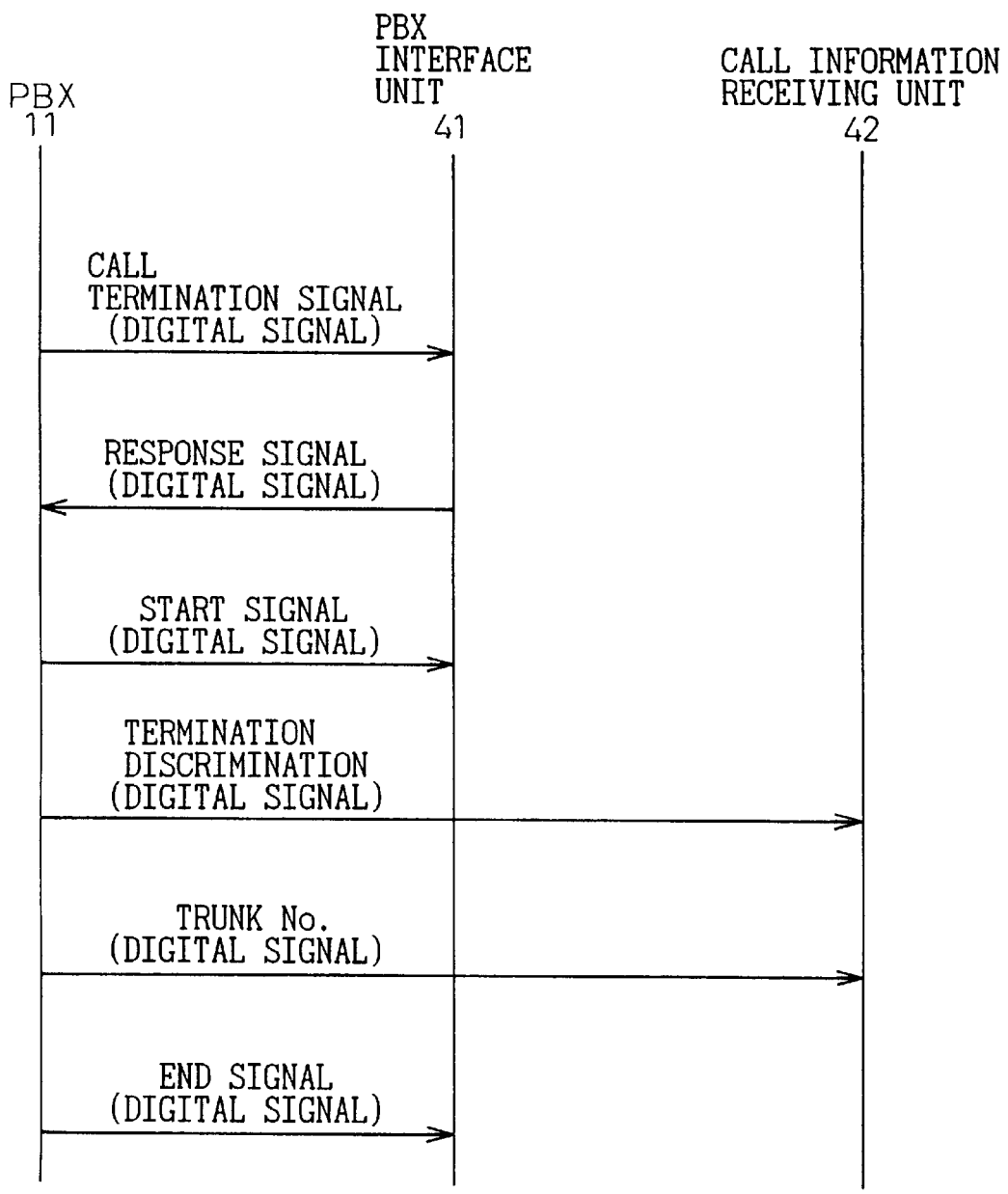

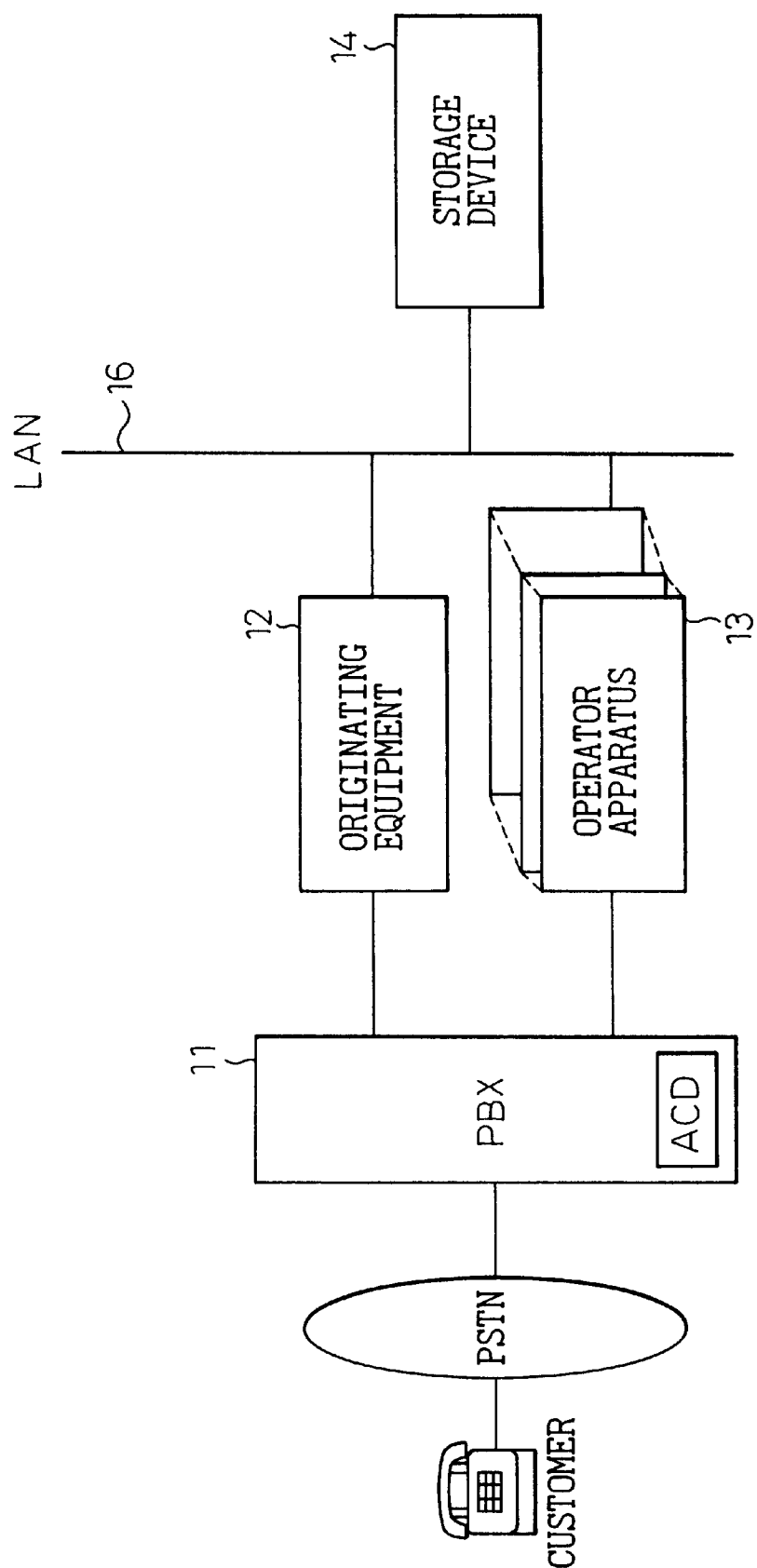

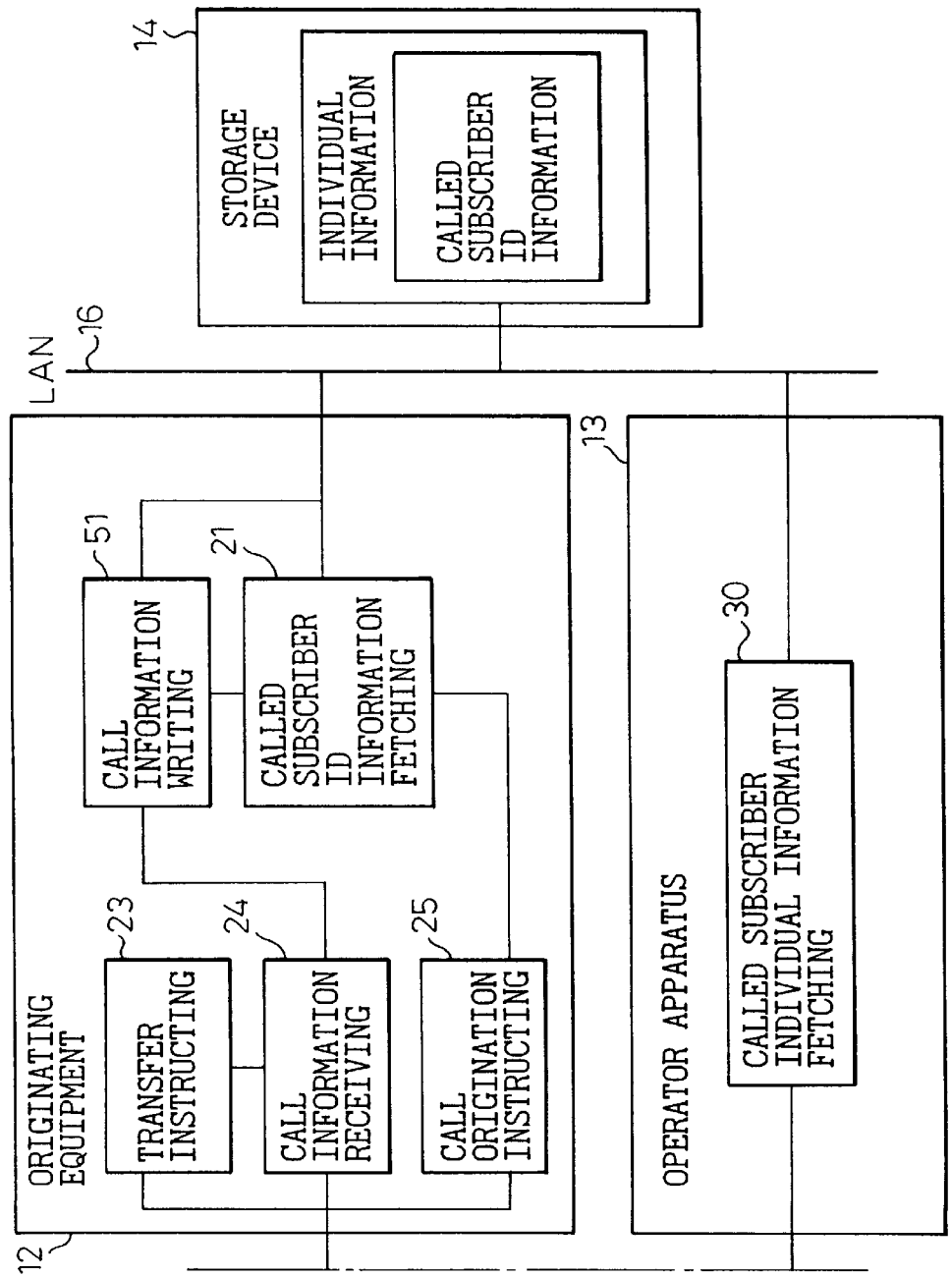

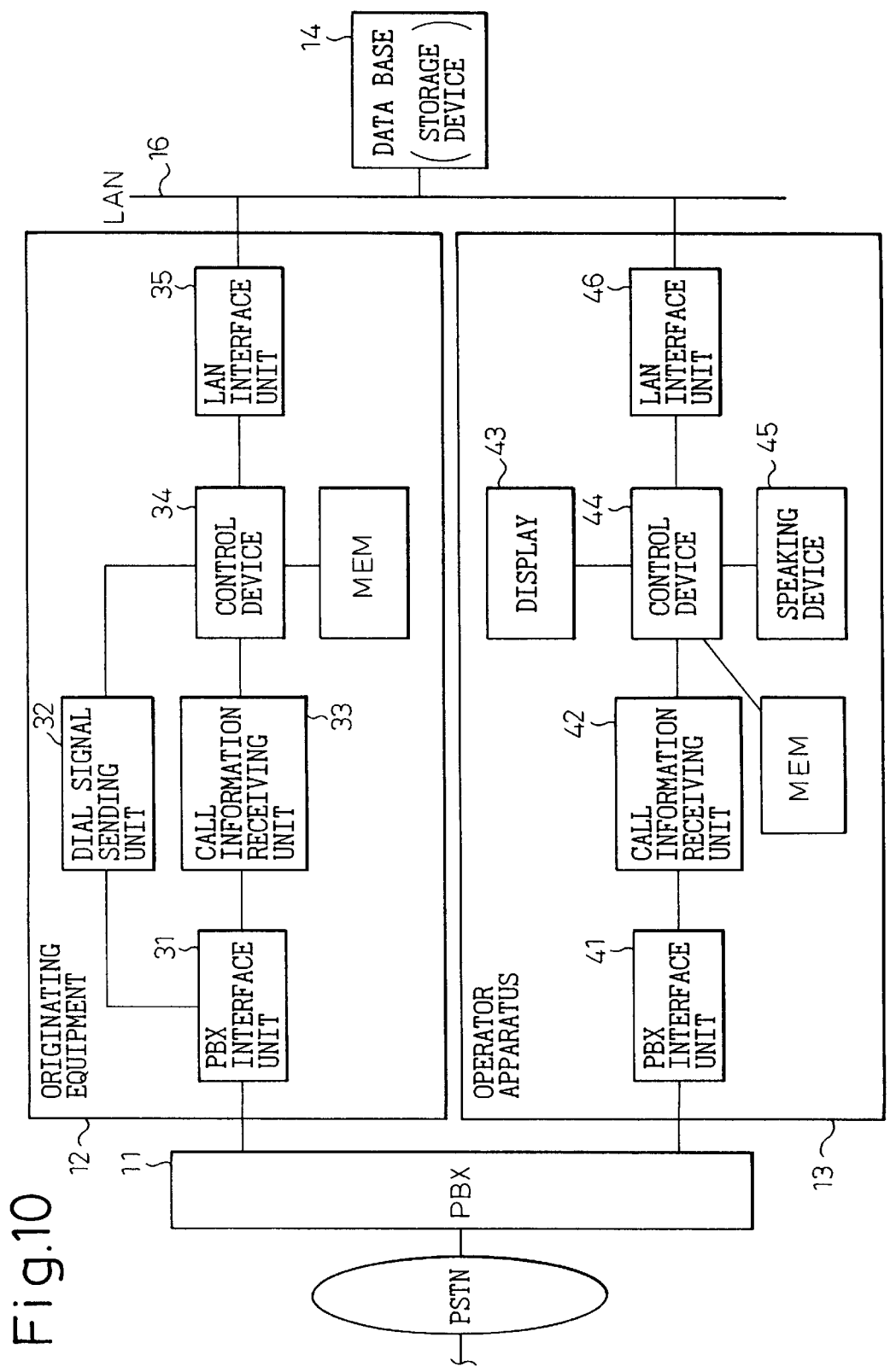

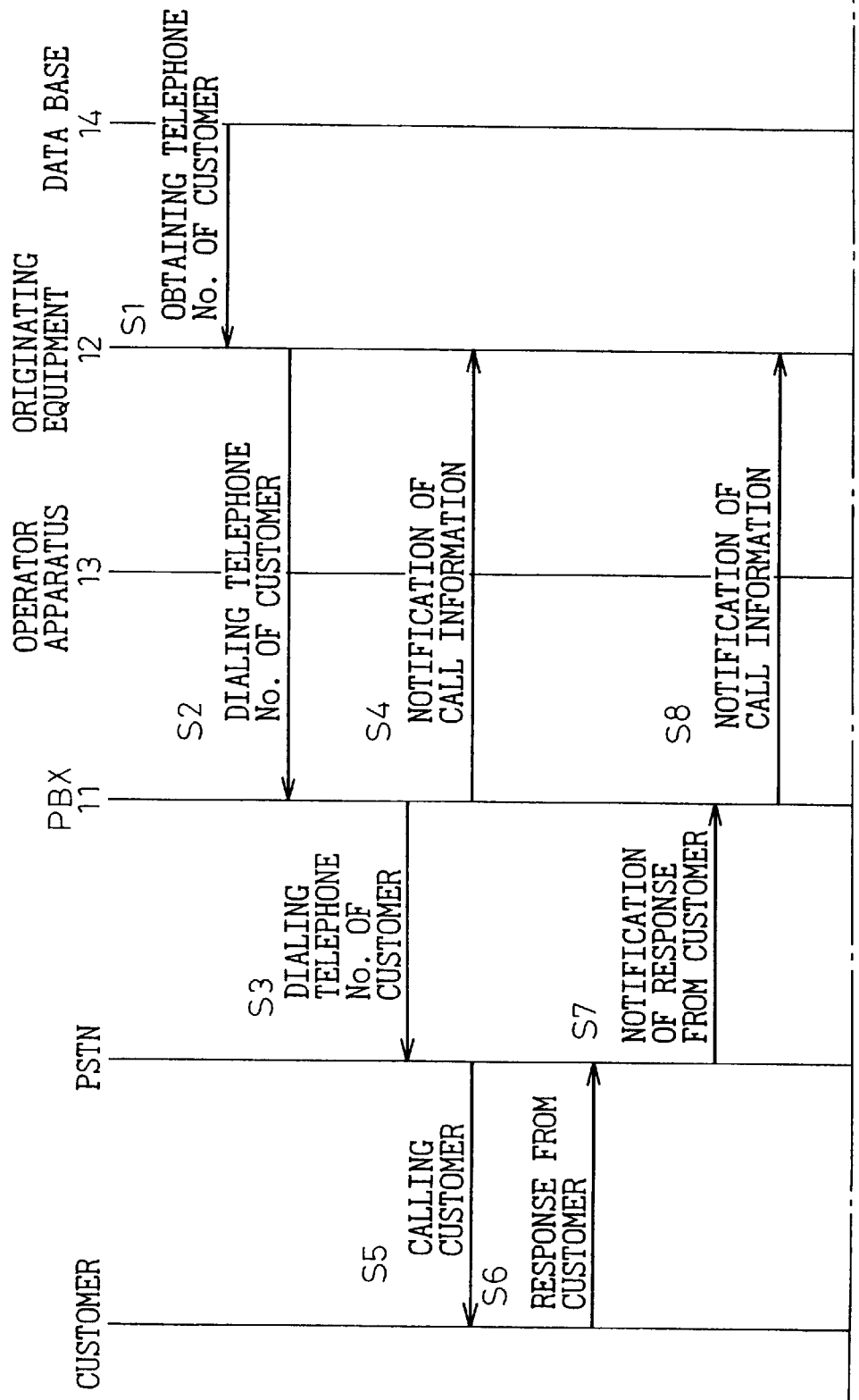

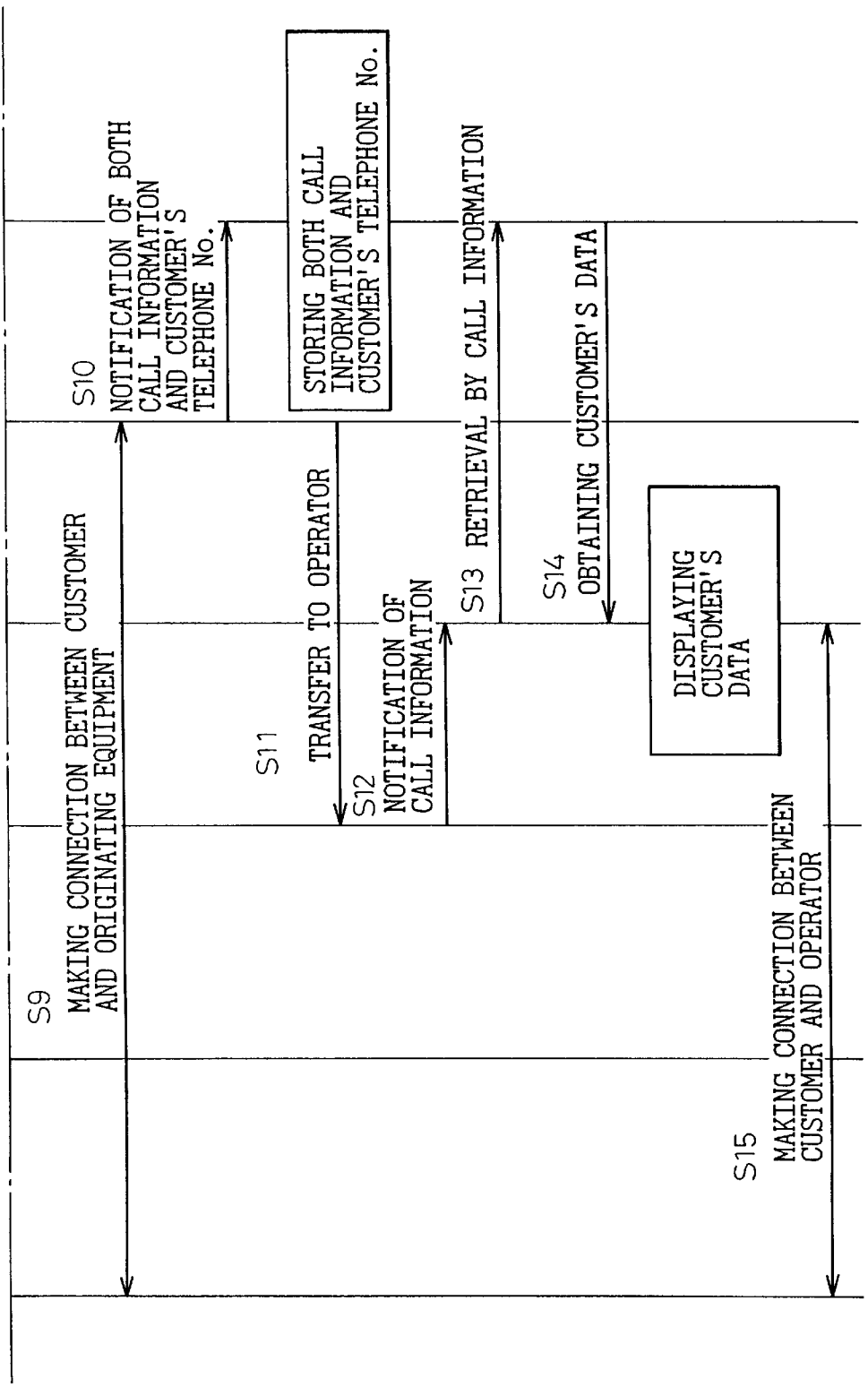

SYSTEM AND METHOD FOR AUTOMATIC CALL

BACKGROUND OF THE INVENTION

1. Field of the Invention

The present invention relates to a system for automatic calls for automatically originating a call to a plurality of called subscribers (for example customers) and distributing responses thereto to one of a plurality of operator use equipment.

2. Description of the Related Art

When originating calls from a call center to customers for reasons of advertisement, reminders, etc. along with the growing competition among companies in recent years, it is demanded to more efficiently process the calls. In order to realize this, methods of automatically originating calls to customers may be considered. As one of them, there is the method, in the call center, a computer is connected to a private branch exchange (PBX) and the computer originates the calls through the private branch exchange and, when a customer responds, transfers the received call to an operator by the private branch exchange, and then the operator processes the call. At this time, the operator obtains individual information concerning the customer of the transferred call from a data base storing the customer information, displays the same on a display, and converses with the customer while viewing the individual customer information on the display.

In this related art, however, when the private branch exchange uses an automatic call distribution (ACD) function, the private branch exchange equally distributes the responding calls to the operators in the order of the operators with the longest idling time. For this reason, it cannot be determined from outside the private branch exchange to which operator a call will be transferred, therefore there has been a problem in that the individual customer information relating to the connected call cannot be informed to the destination operator.

Further, when it is necessary for the way the operator deals with the customer to be changed, such as for example when the customer is extremely important, it is desirable that the call of such a customer be connected to a special person in charge. However, if the private branch exchange has an ACD function, the system of the related art could not ensure such a connection.

SUMMARY OF THE INVENTION

The present invention was made in consideration with such a problem and has as an object thereof to make it possible for an operator possible to obtain individual customer information for the transferred call even if the private branch exchange uses an ACD function.

Another object of the present invention is to make it possible to transfer a particular call to a particular operator.

To attain the above objects, an automatic call system of the present invention comprises a storage device, a private branch exchange, an originating equipment, and a plurality of operator apparatuses. This private branch exchange originates a call in response to an instruction for call origination from the originating equipment and notifies the call information relating to the originating call to both the originating equipment and the destination operator apparatus. The originating equipment stores the called subscriber's ID information such as customer telephone numbers in the storage device linked with the above call information. When a response from a called subscriber is transferred to the operator apparatus, the destination operator apparatus retrieves the called subscriber's ID information from the storage device by using the above call information as a key, obtains the individual information of the called subscriber, and displays this on for example a monitor for the operator.

Thus, according to the present invention, there is provided an automatic call system for distributing responses to originating calls to one among a plurality of operator apparatuses wherein even if the private branch exchange uses an ACD function, the operator can obtain the individual customer information of the transferred call.

BRIEF DESCRIPTION OF THE DRAWINGS

These and other objects and features of the present invention will become clearer from the following description of the preferred embodiments given in reference to the attached drawings, in which:

FIG. 1 is a view of a first basic configuration according to the present invention;

FIG. 5 is a second part of the sequence diagram for explaining the operation of the entire call center;

FIG. 6 is a detailed sequence diagram of notification of calling information from a private branch exchange 11 to an originating equipment 12;

FIG. 7 is a detailed sequence diagram of the notification of calling information from the private branch exchange 11 to an operator apparatus 13;

FIG. 8 is a view of a second basic configuration according to the present invention;

FIGS. 9A and 9B are views of a more concrete configuration of the second basic configuration shown in FIG. 8;

FIG. 10 is a view of an embodiment of the automatic call system based on the second basic configuration;

FIG. 11 is a first part of a view for explaining an operation of the entire call center;

FIG. 12 is a second part of a view for explaining the operation of the entire call center;

DESCRIPTION OF THE PREFERRED EMBODIMENTS

Figure 2A:
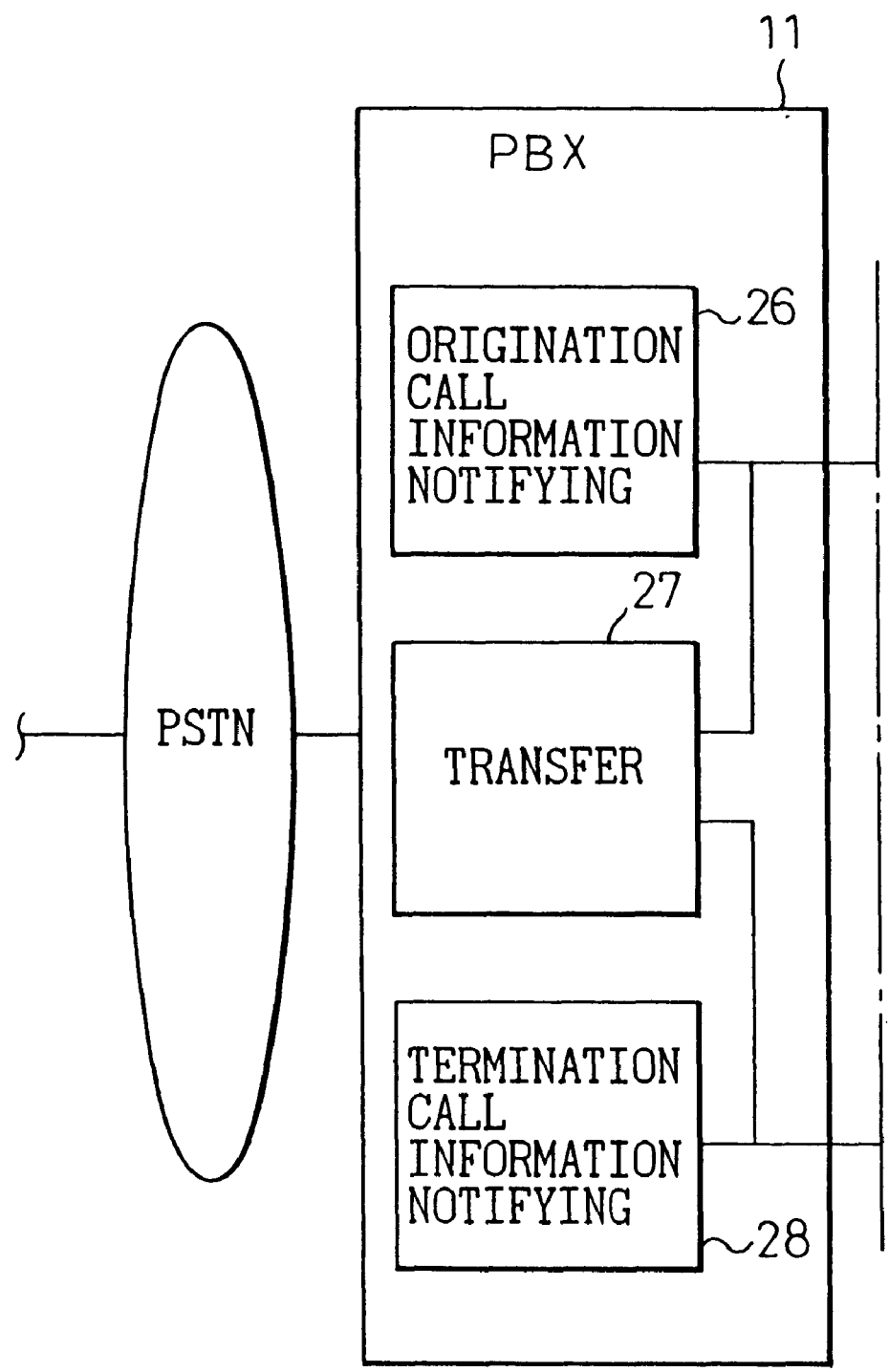
FIGS. 2A and 2B are views of a more concrete configuration of the first basic configuration shown in FIG. 1.

The embodiments of the present invention will be described next with reference to the related figures.

The present invention is predicated upon an automatic call system such as a call center for distributing an originating call to one of a plurality of operator apparatuses.

FIG. 1 is a view of a first basic configuration according to the present invention. This automatic call system comprises a first storage device 14, a second storage device 15, a private branch exchange 11, originating equipment 12, and a plurality of operator apparatuses 13.

The first storage device 14 stores individual information containing ID information of the individual called subscribers for a plurality of called subscribers as a data base.

The originating equipment 12,
(i) obtains ID information of called subscribers to be accessed;
(ii) instructs the origination of calls to the called subscriber to the private branch exchange 11 based on the ID information;
(iii) receives the call information of the private branch exchange 11 relating to the originating call from the private branch exchange 11;
(iv) links the ID information relating to the originating call and the call information and stored it in the second storage device 15; and
(v) instructs that a call be transferred to one of a plurality of operator apparatuses 13 when a response from a called subscriber with respect to the originating call is notified from the private branch exchange 11.

The private branch exchange 11
(i) notifies the call information relating to the originating call instructed from the originating equipment 12 to the originating equipment and
(ii) transfers the call responded to from the called subscriber and the notifies the call information relating to the call to one of a plurality of operator apparatuses 13 in accordance with the instruction of transfer from the originating equipment 12.

The operator apparatus 13
(i) fetches the ID information of the called subscriber from the second storage device 15 by using the call information relating to the call when the call is transferred; and
(ii) fetches the individual information of the called subscriber from the first storage device 14 by using the fetched ID information.

Figure 2B:
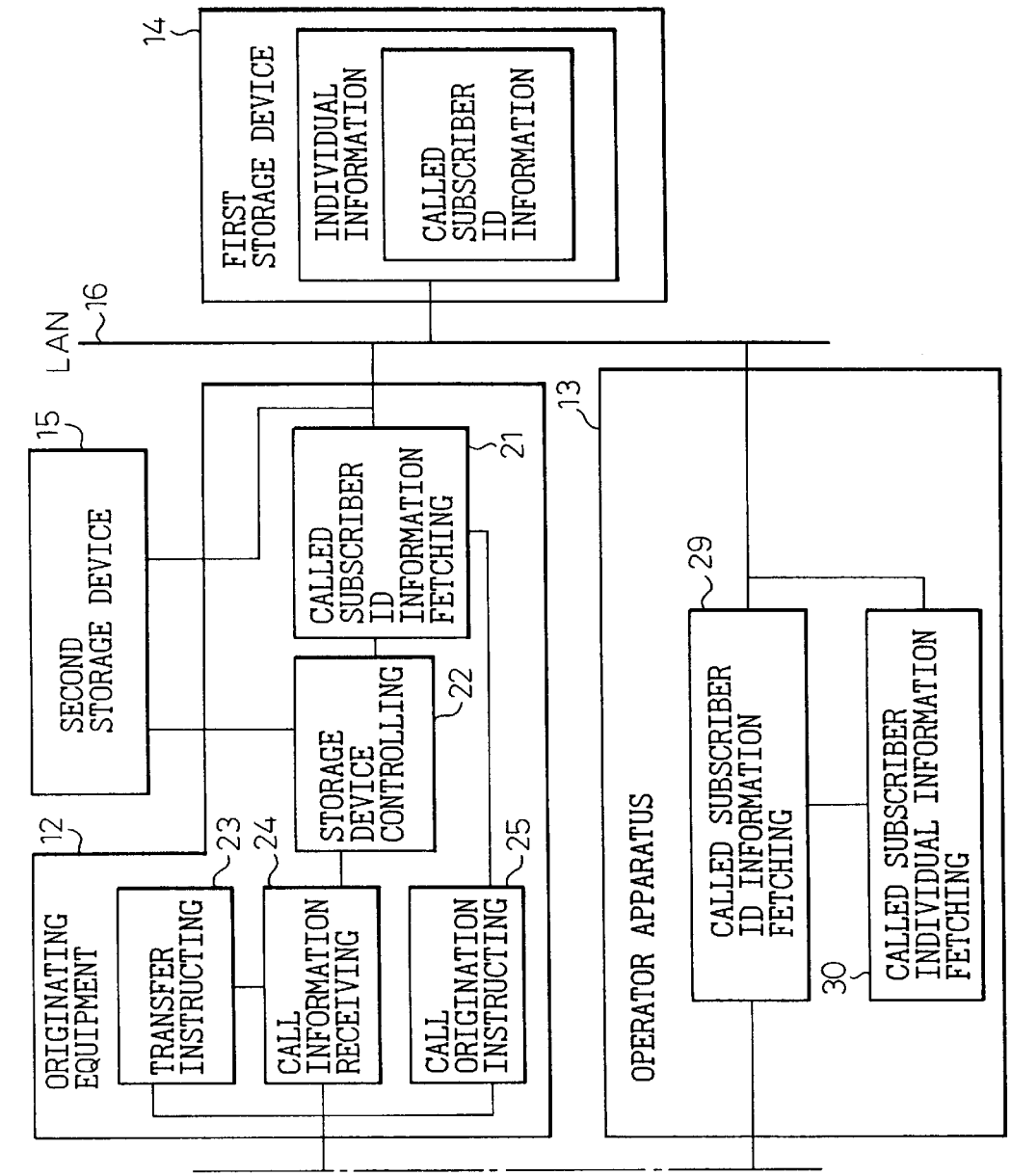

FIGS. 2A and 2B are views of the more concrete configuration of the first basic configuration shown in FIG. 1. In the figures, the originating equipment 12 is provided with a called subscriber ID information fetching means 21 for obtaining the ID information of a called subscriber to be accessed, a call origination instructing means 25 for instructing call origination to the called subscriber to the private branch exchange 11 based on the ID information, a call information receiving means 24 for receiving the call information of the private branch exchange 11 relating to the originating call from the private branch exchange 11, a storage device controlling means 22 for making the second storage device 15 store the ID information relating to the originating call linked with the call information, and a transfer instructing means 23 for instructing the transfer of the call to one of a plurality of operator apparatuses 13 when a response from a called subscriber with respect to an originating call is notified from the private branch exchange 11.

In FIGS. 2A and 2B, the private branch exchange 11 is provided with an origination call information notifying means 26 for notifying the call information relating to the origination call instructed from the originating equipment 12 to the originating equipment 12, a transfer means 27 for transferring a call responded to from a called subscriber to one of a plurality of operator apparatuses 13 in accordance with an instruction for transferring a call origination from the originating equipment, and a termination call information notifying means 28 for notifying the call information relating to the termination call.

In FIGS. 2A and 2B, the operator apparatus 13 is provided with a called subscriber ID information fetching means 29 for fetching the ID information of a called subscriber from the second storage device 15 by using the call information relating to this call when the call is transferred and a called subscriber individual information fetching means 30 for fetching the individual information of a called subscriber from the first storage device 14 by using the fetched ID information. In the first storage device 14, a plurality sets of individual information containing the ID information of called subscribers (called subscriber ID information) are stored as a data base.

The automatic call system shown in FIG. 1 and FIGS. 2A and 2B operates as follows.

The private branch exchange 11 originates a call in accordance with the instruction of the call origination from the originating equipment 12 and notifies the call information relating to the call origination, for example, connecting terminal information (trunk number) of the private branch exchange, to the originating equipment 12 and the destination operator apparatus 13.

The originating equipment 12 stores the called subscriber ID information such as customer telephone numbers in the second storage device 15 linked with the call information.

When a response from a called subscriber is transferred to one among a plurality of operator apparatuses 13, this destination operator apparatus 13 retrieves the called subscriber ID information from the second storage device 15 via a local area network (LAN) 16 by using the call information as a key. By this, even if the private branch exchange 11 uses an ACD function, it becomes possible for the operator apparatus 13 to fetch the ID information of the called subscriber of the transferred call. Accordingly, it becomes possible for the operator apparatus 13 to obtain individual information of the called subscriber from the first storage device 14, for example, name, address, age, occupation, used bank, family members, and so on.

The instruction for transfer from the originating equipment 12 to the private branch exchange 11 is transferred to one among a plurality of operator apparatuses 13 constituting an ACD group under the ACD function of the private branch exchange 11 if for example a pilot extension station is used. If the instruction is transferred by using a specified extension station, the instruction can be transferred by individually designating the operator apparatuses 13 having the specified extension station.

Figure 3:
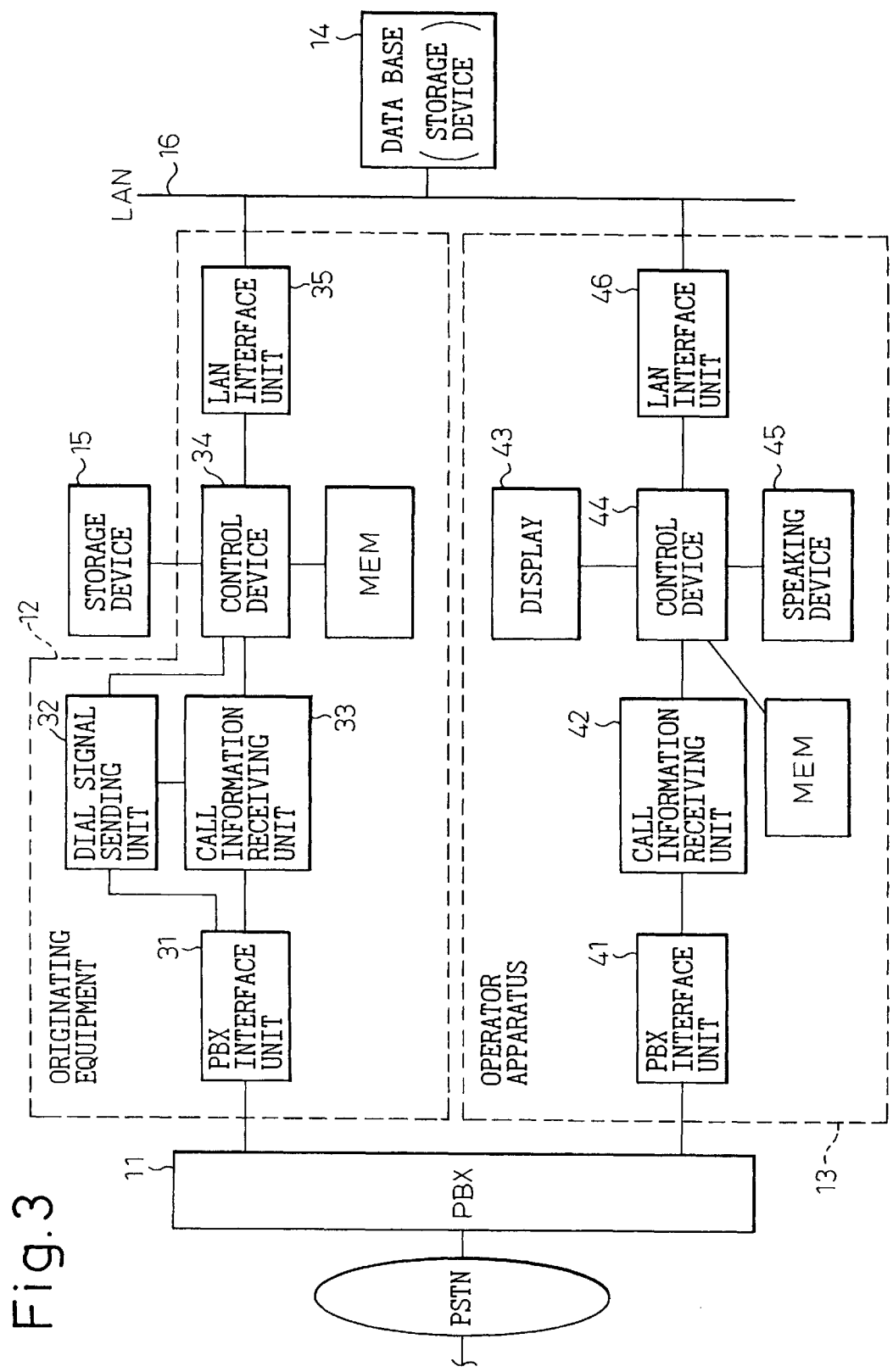
FIG. 3 is a view of an embodiment of an automatic call system based on the first basic configuration.

FIG. 3 is a view of an embodiment of an automatic call system based on the first basic configuration. Note that the same reference numerals or symbols are given to similar constituent elements throughout all of the figures.

FIG. 3 shows a call center constructed by an automatic call system according to an embodiment of the present invention. In FIG. 3, this call center is basically constituted by the private branch exchange 11 connected to a public switched telephone network (PSTN), originating equipment 12 accommodated in this private branch exchange 11, a plurality of operator apparatuses 13 accommodated in the private branch exchange 11, a data base (storage device) 14, and a LAN 16 for connecting these originating equipment 12, operator apparatus 13, and data base 14.

The private branch exchange 11 is provided with a function for originating calls to customers (FIG. 1) according to a request from the originating equipment 12 and, at the same time, a function for connecting a call responded to from a called subscriber (customer) to one of a plurality of operator apparatuses 13. It is constituted so that the operator apparatus 13 can be connected to by using the ACD function (FIG. 1). This ACD function is a function for equally distributing calls by sequentially connecting operator apparatuses 13 in the order from the operators having the longest idling time after the termination of communication. By this, the load of a plurality of operator apparatuses 13 can be equally distributed.

The data base 14 is a storage device for storing individual customer information of many customers as the data base as mentioned above. This individual customer information contains customer ID information such as the telephone numbers of customers together with a variety of other information concerning the customers. This data base 14 has a function for receiving inquiries keyed to customer ID information from the operator apparatus 13, a function for retrieving the individual customer information corresponding to the customer ID information by using the customer ID information as a key, and a function for notifying the retrieved individual customer information to the operator apparatus 13 which performed the inquiry.

The originating equipment 12 is a host computer and is provided with a private branch exchange interface unit 31, a dial signal sending unit 32, a call information receiving unit 33, a control device 34, and a LAN interface unit 35.

This originating equipment 12 has the following six functions:

<1> a function for inquiring about the required telephone number of a customer who must be called from the data base 14 storing the individual customer information (mainly performed by the control device 34 and the LAN interface unit 35);

<2> a function for instructing call origination to the customer to the private branch exchange 11 (mainly performed by the control device 26, the dial signal sending unit 32, and the private branch exchange interface unit 31);

<3> a function for receiving the call information in the private branch exchange (connecting terminal information of the private branch exchange, more concretely a trunk number etc.) for acknowledging the response from the called subscriber (customer) with respect to the originated call from the private branch exchange 11 and for identifying the call from the private branch exchange 11 (mainly performed by the private branch exchange interface unit 31, call information receiving unit 33, and control device 34);

<4> a function for storing the customer ID information together with the call information (mainly performed by the data base 14);

<5> a function for instructing the transfer of the call to one of a plurality of operator apparatuses 13 after the response from the called subscriber (customer) by using a specified extension number or a pilot extension number to the private branch exchange 11 (mainly performed by the control device 34 and the private branch exchange interface unit 31); and <6> a function for notifying the customer ID information stored in the data base 14 to the inquiry sending operator apparatus 13 via the LAN 16 in response to the first inquiry while specifying the call information (mainly performed by the storage device 15, control device 34, and LAN interface unit 35).

The operator apparatus 13 is constituted by a small size computer such as a personal computer and is provided with a private branch exchange interface unit 41, a call information receiving unit 42, a display device 43, a control device 44, a speaking device 45, a LAN interface unit 46, etc. This operator apparatus 13 has the following four functions:

<1> a function for receiving the call information of the call instructed to be transferred by the originating equipment 12 from the private branch exchange 11 (mainly performed by the private branch exchange interface unit 41, call information receiving unit 42, and control device 44);

<2> a function for identifying the received call information and issuing a first inquiry for inquiring about the customer ID information corresponding to the call information to the originating equipment 12 via the LAN 16 and, further, receiving the customer ID information notified from the originating equipment 12 in response to the first inquiry (mainly performed by the control device 44 and the LAN interface unit 46);

<3> a function for identifying the customer ID information notified from the originating equipment 12 and issuing a second inquiry for inquiring about the individual customer information corresponding to the customer ID information to the data base 14 and, further, making the display device 43 display the individual customer information notified from the data base 14 thereon in response to the second inquiry (mainly performed by the display device 43, control device 44, and LAN interface unit 46); and <4> a function for terminating the call instructed to be transferred by the originating equipment 12 and speaking with the customer relating to the call (mainly performed by the private branch exchange interface unit 41, control device 44, and speaking device 45).

The LAN 16 is an Ethernet or the like and can transfer data, via this LAN 16, among the originating equipment 12, the operator apparatus 13, and the data base 14.

Note that the originating equipment 12 and the operator apparatus 13 individually have program storing devices MEM for storing control programs, a control program for executing functions of the originating equipment 12 on the computer is stored in the program storing device MEM in the originating equipment 12, and a control program for executing functions of the operator apparatus 13 on the computer is stored in the program storing device MEM in the operator apparatus 13.

Figure 4:
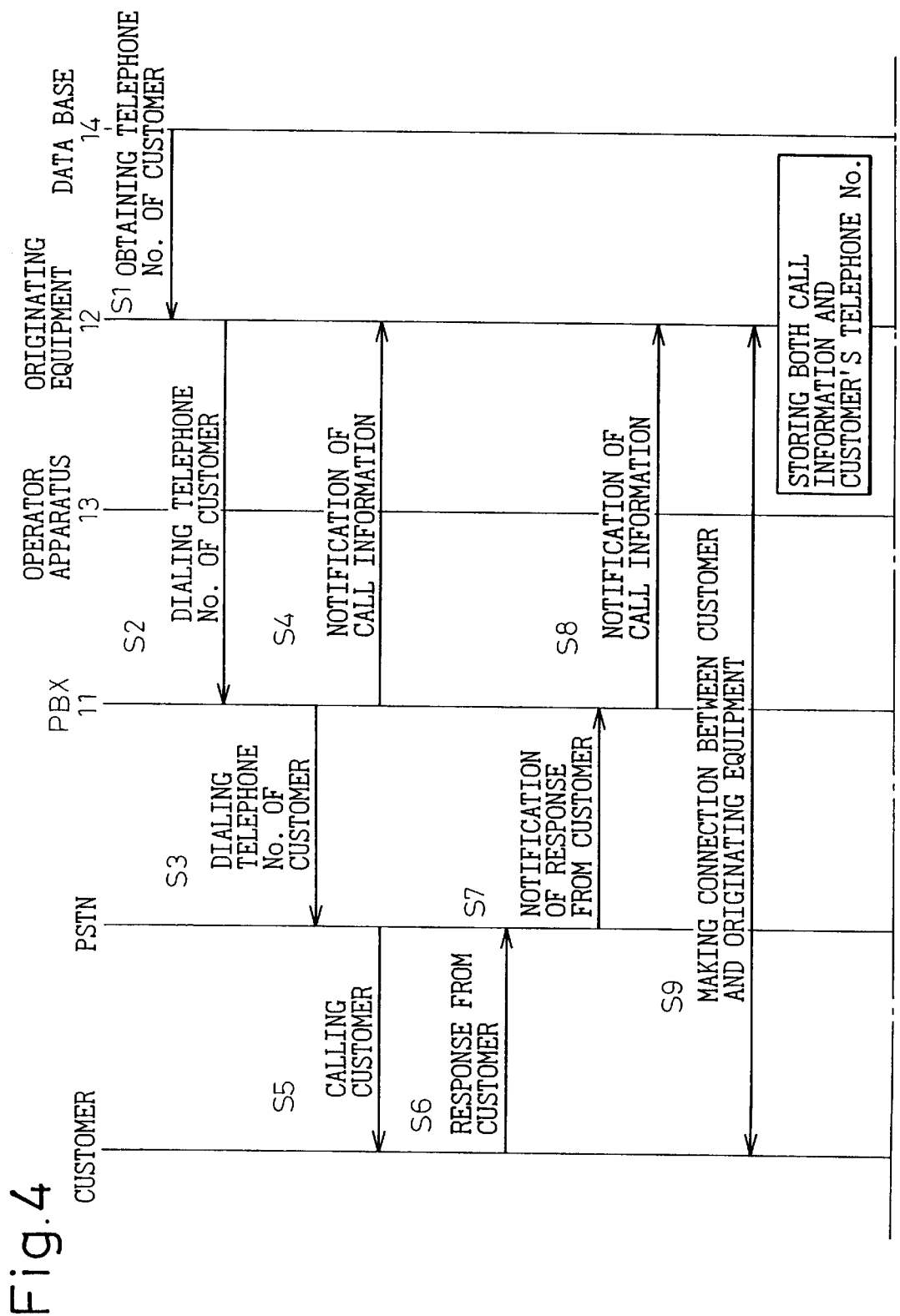
FIG. 4 is a first part of a sequence diagram for explaining an operation of an entire call center.

Below, an explanation will be given of the operation of the call center to which the automatic call system of the present invention mentioned above is applied by referring to the sequence diagrams FIG. 4 and FIG. 5 are parts of a sequence diagram for explaining the operation of a call center.

First, an explanation will be made of the operation of the entire call center by referring to FIG. 4 and FIG. 5.

Step 1 (S1): The control device 34 in the originating equipment 12 accesses the data base 14 from the LAN interface unit 35 via the LAN 16 and obtains a telephone number of a customer to be called from the data base 14.

Step 2 (S2): This telephone number is used also as the customer ID information for identifying the customer. The dial signal sending unit 32 instructs the call origination to the customer to the private branch exchange 11 with the telephone number.

Step 3 (S3): The private branch exchange 11 dials the telephone number of the customer and sends this to the PSTN.

Step 4 (S4): The private branch exchange 11 performs the call origination to the customer by using the telephone number received from the originating equipment 12 and, further, sends a trunk number used for the call origination as the call information at this time to the originating equipment 12 by using a digital signal.

Step 5 (S5): The call originated by step S3 is terminated at the customer via the PSTN.

Step 6 (S6): When the customer responds to this terminated call, a response signal thereof is transmitted to the PSTN.

Step 7 (S7): The response signal from the PSTN is notified to the private branch exchange 11.

Step 8 (S8): When receiving the response signal, the private branch exchange 11 notifies the call information (trunk number) corresponding to this response signal to the originating equipment 12. This trunk number is used as the call information (connecting terminal information) for the private branch exchange 11.

Step 9 (S9): As mentioned above, when the customer responds to the originated call, confirmation of the response is notified from the private branch exchange 11 to the originating equipment 12. Then, the control device 34 in the originating equipment 12 makes the storage device 15 store the trunk number as the call information and the customer telephone number as the customer ID information linked with each other (storage).

Next, refer to FIG. 5.

Step 10 (S10): After the response from the customer, the private branch exchange interface unit 31 transfers the conversation to the ACD group containing the operator apparatus 13 by the instruction of the control device 34. The transfer to the ACD group is carried out by using the pilot extension number assigned to the plurality of operator apparatuses 13 constituting the ACD group. Note that, where it is intended to connect a particular customer such as an important customer to a particular operator, an instruction may be given to the private branch exchange 11 so as to transfer the conversation to a specified extension number of the operator in place of the pilot extension number.

Step 11 (S11): When receiving the instruction of transfer by the pilot extension number, the private branch exchange 11 determines one operator apparatus 13 which is empty in the ACD group by using the ACD function possessed by the private branch exchange 11 per se, and the call from the customer is terminated at the determined operator apparatus 13. Further, as the call information, the trunk no. of the transferred call is notified by using the digital signal. Note that where the transfer instruction is received by the specified extension number, the ACD function is not used, and the transfer of the call from the customer and the notification of the call information are carried out to the operator apparatus 13 having the specified extension number.

Step 12 (S12): The control device 44 in the operator apparatus 13 inquires about the customer's telephone number corresponding to the call information to the originating equipment 12 via the LAN interface unit 46 and the LAN 16 by using the call information (trunk no.) received at the call information receiving unit 42 via the private branch exchange interface unit 41 as a key.

Step 13 (S13): The inquired customer's number is notified to the operator apparatus 13.

When receiving the inquiry via the LAN interface unit 35, the control device 34 in the originating equipment 12 retrieves the customer's telephone number from the storage device 15 by using the trunk no. (call information) contained in the inquiry as a key. The retrieved customer's telephone number is notified to the operator apparatus 13 via the LAN interface unit 35 and the LAN 16.

Step 14 (S14): The control device 44 in the operator apparatus 13 inquires about the individual customer information of the customer corresponding to the customer's telephone number to the data base 14 via the LAN interface unit 46 and the LAN 16 by using the customer's telephone number received from the originating equipment 12 as a key.

Step 15 (S15): The data base 14 retrieves the individual customer information by using the customer's telephone number contained in the inquiry as a key and notifies the retrieved individual customer information via the LAN 16 to the operator apparatus 13. Here, the customer's data is obtained.

Thus, the control device 44 in the operator apparatus 13 displays the individual customer information received via the LAN interface unit 46 on the display device 43.

Step 16 (S16): Subsequently, according to the instruction from the control device 44, the private branch exchange interface unit 41 responds to that call, and thus the conversation between the customer and the operator is commenced. By this, the operator can adequately respond to a customer while viewing the individual customer information displayed on the display device 43.

FIG. 6 is a sequence diagram showing details of the notification of the call information from the private branch exchange 11 to the originating equipment 12. The start signal of notification of the call information is sent from the private branch exchange 11 to the private branch exchange interface unit 31 in the originating equipment 12. Subsequently, the response signal is sent from the private branch exchange 11 to the call information receiving unit 33. Thereafter, the trunk number used as the call information is sent from the private branch exchange 11 to the call information receiving unit 33. Further, the termination signal informing the termination of the notification of the call information is sent to the private branch exchange interface unit 31.

The above sequence corresponds to step S4 in FIG. 5.

FIG. 7 is a detailed sequence diagram of the notification of the call information from the private branch exchange 11 to the operator apparatus 13. In the figure, when the termination signal is transferred from the private branch exchange 11 to the private branch exchange interface unit 41 in the operator apparatus 13, the response signal is returned from the private branch exchange interface unit 41. Subsequently, the start signal is notified from the private branch exchange 11 to the private branch exchange interface unit 41. Further, after the termination discrimination signal is notified from the private branch exchange 11 to the call information receiving unit 42, the trunk number used as the call information is sent to the call information receiving unit 42. The termination signal notifying the termination of the notification of the call information (trunk number) is sent to the private branch exchange interface unit 41. Note that, the termination discrimination signal is a signal indicating whether the termination is a direct termination or a transfer from another extension.

In the above case, when there is a response from a customer, if a long time is taken until the call is connected to the operator apparatus 13, it is possible to send a prerecorded announcement requesting the customer to wait by using an automatic audio response equipment or the like.

As explained above, in the first basic configuration, the call information (trunk number) is notified to the originating equipment 12 and the destination operator apparatus 13, the originating equipment 12 stores the customer's telephone number linked with the call information, and the destination operator apparatus 13 inquires about the customer's telephone number by using the call information as a key, whereby it becomes possible for the originating equipment 12 to notify the customer's telephone number to the destination operator even if the private branch exchange 11 uses the ACD function. Accordingly, it becomes possible for the operator apparatus 13 to obtain the individual customer information of the related customer from the data base 14 by using the customer's telephone number.

In working the present invention, various modifications are possible other than those mentioned above. For example, in the above embodiment, the storage device 15 for storing the call information and the customer ID information from the private branch exchange 11 was provided at the originating equipment 12 side, but possible to replace this by another storage device connected to the LAN 16 in the same way as the data base 14. In this case, the storage device is given a function of being able to write the call information and the customer ID information and also a function of notifying the retrieved customer ID information to the related operator apparatus 13 in response to an inquiry from the operator apparatus 13 via the LAN 16.

FIG. 8 is a view of a second basic configuration according to the present invention.

The difference of this second basic configuration from the first basic configuration shown in FIG. 1 resides in that the second storage device 15 shown in FIG. 1 is eliminated. Accordingly, as the storage device, only the data base 14 exists.

Figure 9A:
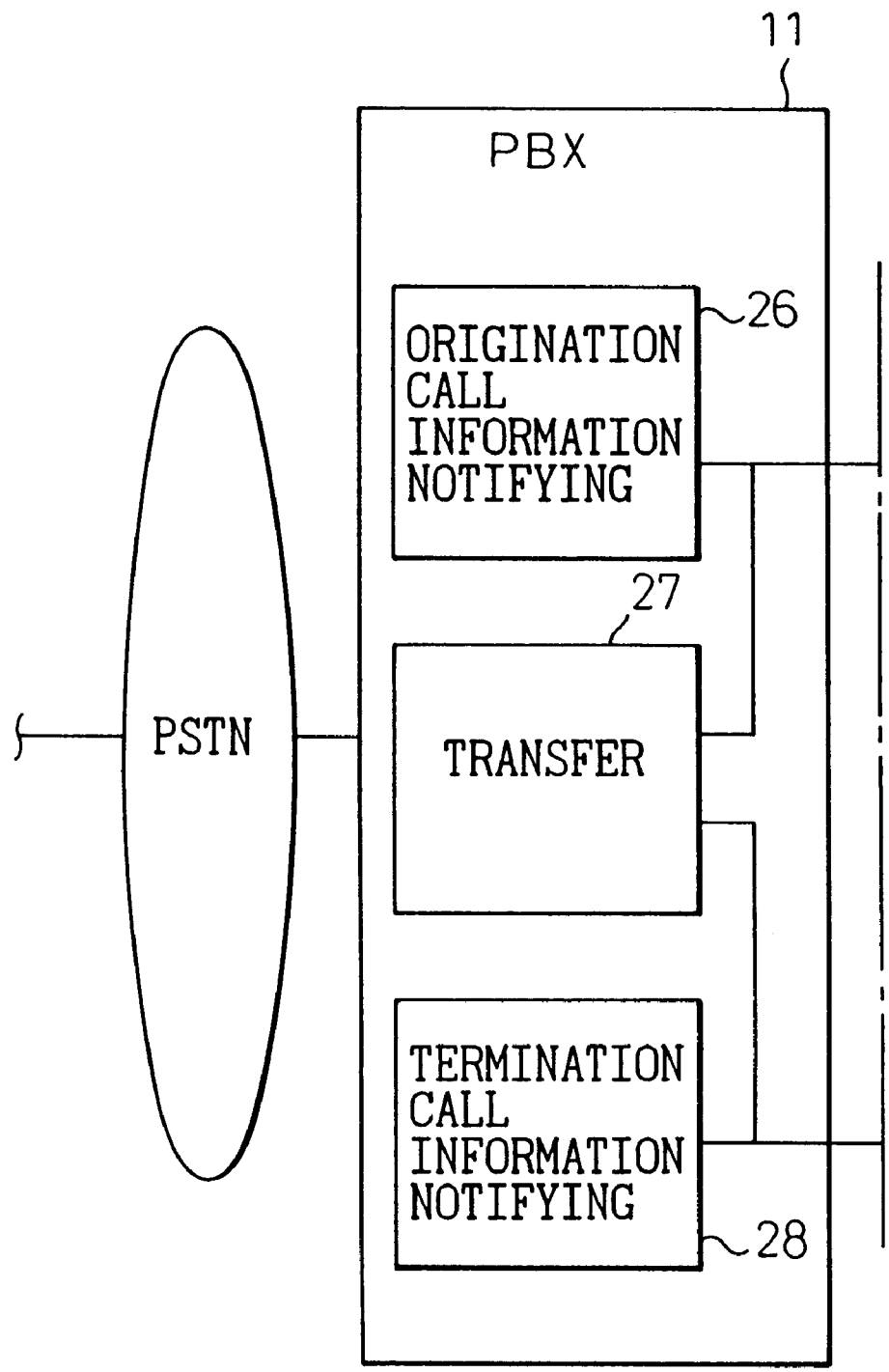

FIGS. 9A and 9B are views of a more concrete configuration of the second basic configuration shown in FIG. 8. The point of this second basic configuration resides in that a structure in which the call information (trunk no.) is stored in the data base 14 connected to the LAN 16 is adopted (the call information is stored in the second storage device 15 in the first basic configuration).

The automatic call system based on the second basic configuration is also an automatic call system comprising, as a whole, similar to the first basic configuration, the storage device 14, private branch exchange 11, originating equipment 12, and a plurality of operator apparatuses 13.

Here, the storage device 14 stores the individual information containing the ID information of the called subscribers for a plurality of called subscribers as a data base.

Further, the originating equipment 12 is provided with a called subscriber ID information fetching means 21 for obtaining the ID information of a called subscriber to be accessed, a call origination instructing means 25 for instructing the call origination to the called subscriber to the private branch exchange 11 based on the ID information, a call information receiving means 24 for receiving the call information of the private branch exchange 11 relating to the originating call from the private branch exchange 11, a call information writing means 51 for making the storage device 14 store the ID information relating to the originating call linked with the call information, and a transfer instructing means 23 for instructing the transfer of the call to one of a plurality of operator apparatuses 13 when a response from a called subscriber to the originating call is notified from the private branch exchange 11.

The private branch exchange 11 is provided with an origination call information notifying means 26 for notifying the call information relating to the origination call instructed from the originating equipment 12 to the originating equipment 12, a transfer means 27 for transferring the call responded to from the called subscriber to one of a plurality of operator apparatuses, and a termination call information notifying means 28 for notifying call information relating to the call.

The operator apparatus 13 is provided with a called subscriber individual information fetching means 30 for fetching individual information of this called subscriber from the storage device 14 by using the call information relating to this call when the call is transferred.

FIG. 10 is a view of an embodiment of the automatic call system based on the second basic configuration. The automatic call system shown in the figure is almost the same as the automatic call system shown in FIG. 3. The difference between the two resides in that the storage device (15 of FIG. 3) for storing the call information (trunk no.) from the private branch exchange 11 on the originating equipment 12 side does not exist in FIG. 10. This is because, in FIG. 10, the call information is stored in the data base 14.

Next, an explanation will be made of the operation of the call center to which the automatic call center of the present invention mentioned above (FIG. 8, FIG. 9, and FIG. 10) is applied.

FIG. 11 and FIG. 12 are parts of a sequence diagram for explaining the operation of the call center.

The sequence shown in FIG. 11 and FIG. 12 corresponds to the sequence shown in FIG. 4 and FIG. 5. The difference between these sequences resides in that step S10 shown in FIG. 12, not existing in FIG. 4, is newly introduced. This step S10 is a step for notifying the call information and the customer's telephone number from the originating equipment 12 (via the LAN 16) to the data base 14.

For this reason, in FIG. 4, a step of "STORING BOTH CALL INFORMATION AND CUSTOMER'S TELEPHONE NO." is executed on the originating equipment 12 side, but in contrast, in FIG. 12, the step of "STORING BOTH CALL INFORMATION AND CUSTOMER'S TELEPHONE NO." is executed on the data base 14 side.

Further, in FIG. 12, among the steps up to the step of "DISPLAYING CUSTOMER'S DATA", the different step from the corresponding steps shown in FIG. 5 is step S13 in FIG. 12.

Step 13 (S13): The operator apparatus 13 retrieves through the data base 14 by the call information (retrieves through the data base 14 by the customer's telephone number in FIG. 5).

Figure 13:
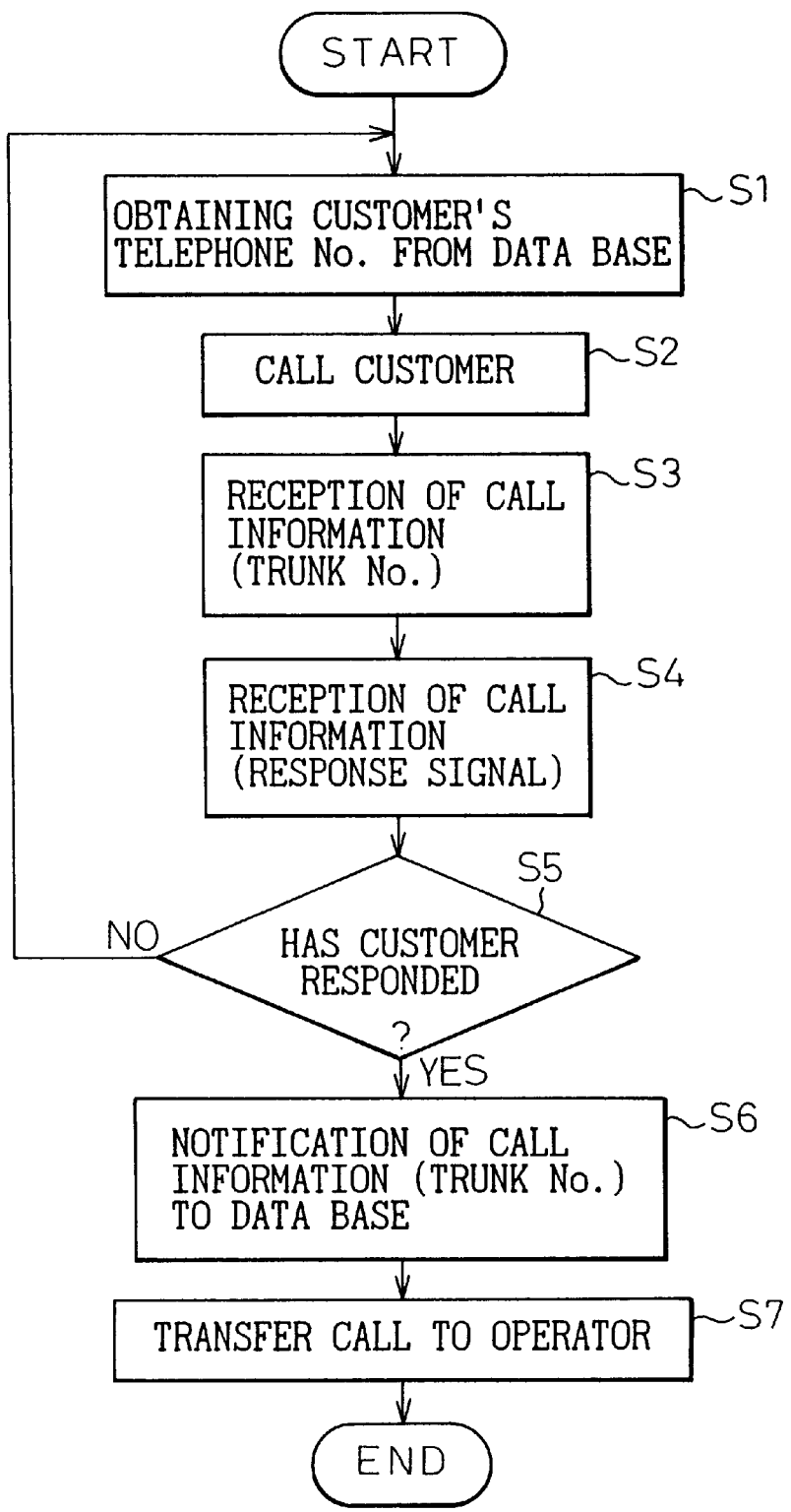
FIG. 13 is a flow chart of a processing of the originating equipment 12 shown in FIG. 10.

FIG. 13 is a flow chart of the processing of the originating equipment 12 shown in FIG. 10. In the figure;

Step S1: The originating equipment 12 specifies the customer who becomes the called subscriber and obtains the customer's telephone number from the data base 14.

Step S2: A call is originated to the customer from the originating equipment 12 via the private branch exchange 11 (call origination).

Step S3: The private branch exchange 11 transmits the call information (trunk no.) when performing the call origination, and this is received at the originating equipment 12.

Step S4: The call information (response signal derived from a response signal from the customer and sent via the PSTN and the exchange 11) to the call origination is received by the originating equipment 12.

Step S5: The originating equipment 12 checks whether or not the customer (called subscriber) responds via the private branch exchange 11.

Step S6: When detecting that the customer responded, the originating equipment 12 notifies the call information (trunk no.) which has been already received at the above step S3 to the data base 14.

Step S7: The terminated call is transferred to the operator.

Figure 14:
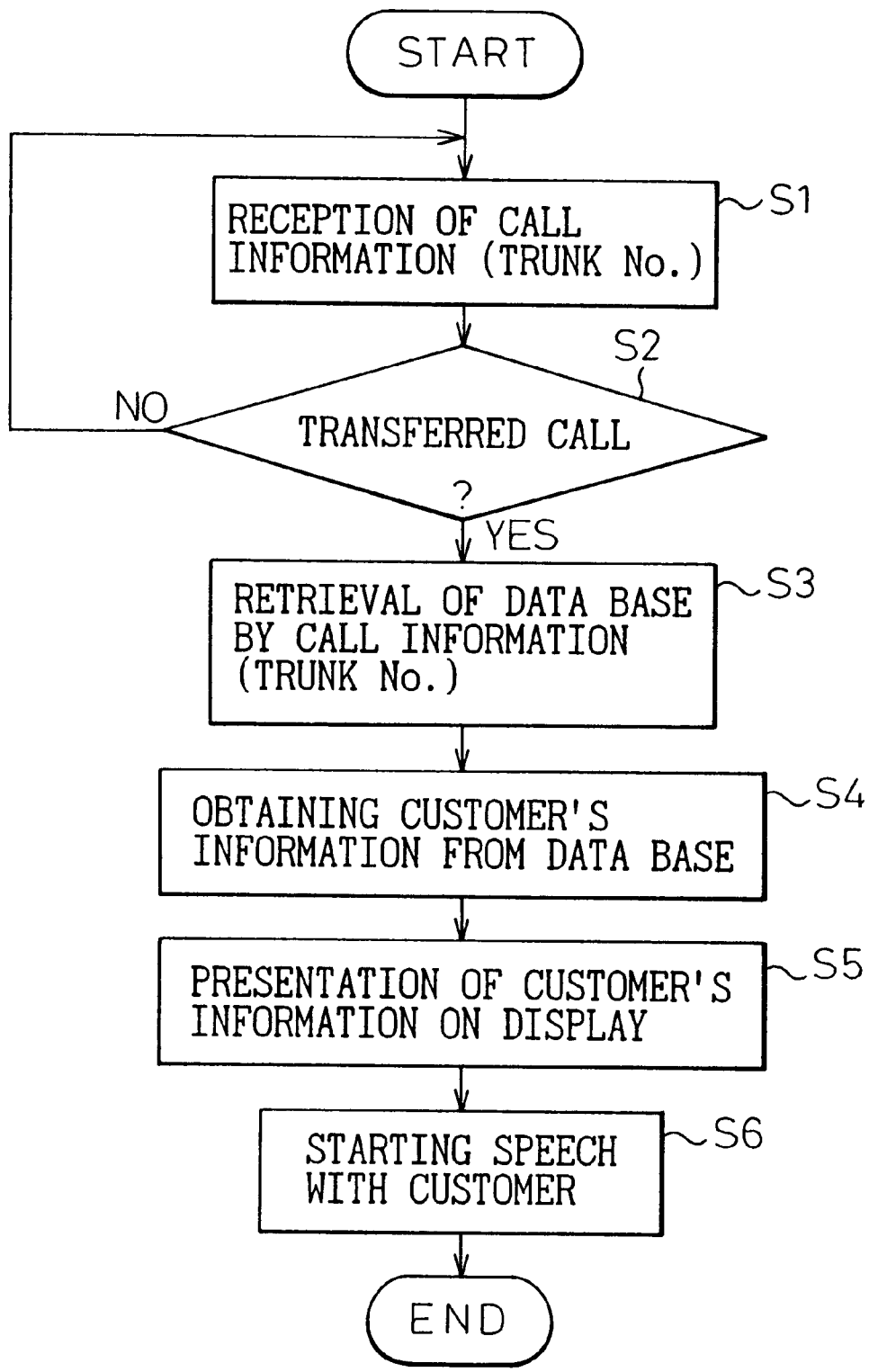
FIG. 14 is a flow chart of the processing of the operator apparatus 13 shown in FIG. 10.

FIG. 14 is a flow chart of the processing of the operator apparatus 13 shown in FIG. 10.

Step S1: The operator apparatus 13 receives the call information (trunk no.) from the private branch exchange 11 (corresponding to step S12 of FIG. 12).

Step S2: The operator apparatus 13 checks whether or not the terminated call from the private branch exchange 11 is a transferred call from the originating equipment 12.

Step S3: When deciding that the terminated call is a transferred call from the originating equipment 12, the operator apparatus 13 retrieves through the data base 14 by the call information (trunk no.) received at above step S1.

Step S4: The operator apparatus 13 obtains the individual customer information retrieved from the data base 14 at above step S3.

Step S5: The operator apparatus 13 displays the obtained individual customer information on the display device 43, for example, the display of a personal computer.

Step S6: The operator starts the conversation with the related customer while monitoring the individual customer information displayed on the display.

Figure 15:
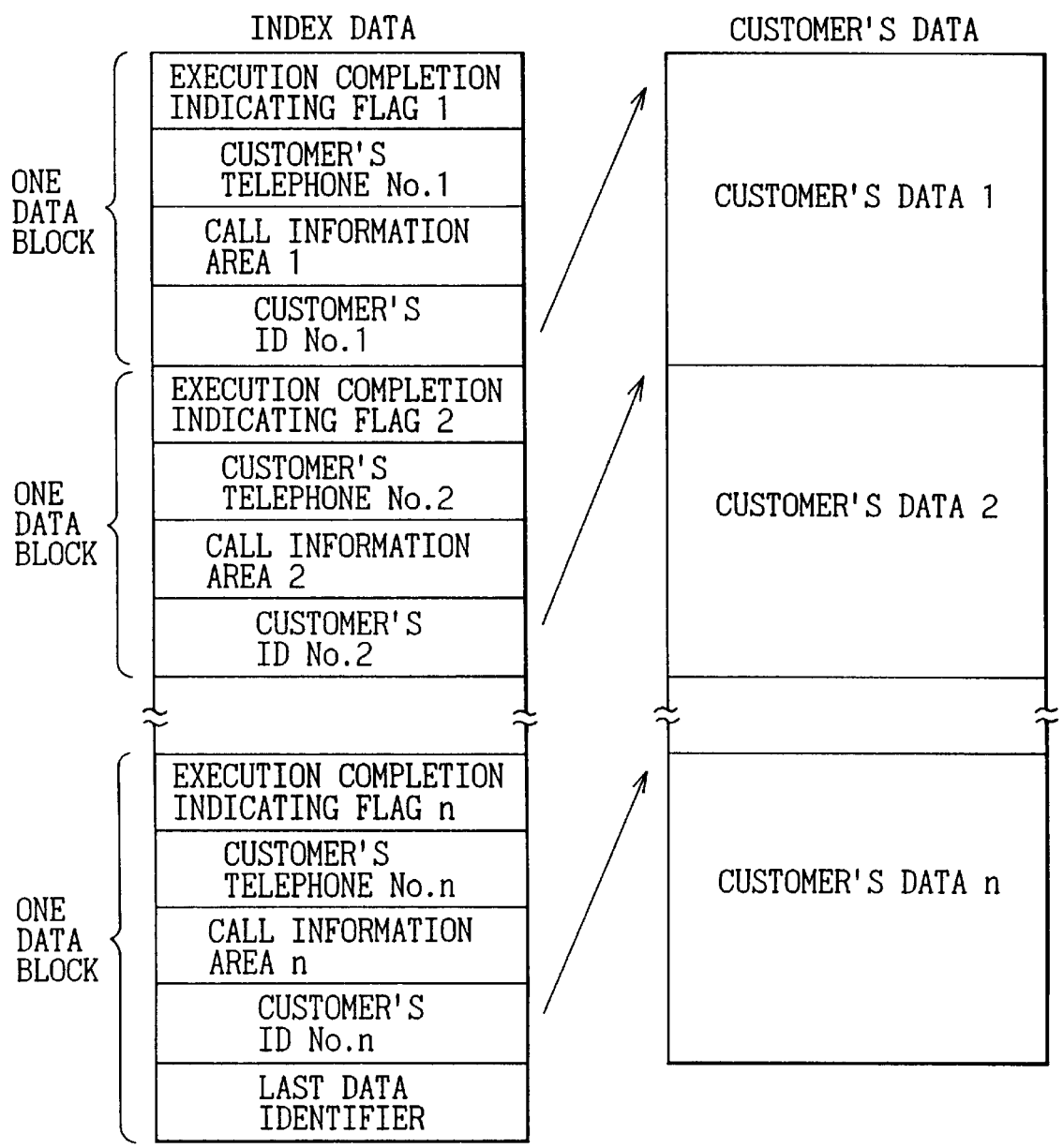
FIG. 15 is a view of a memory format in a data base 14 shown in FIG. 10.

FIG. 15 is a view of the memory format in the data base 14 shown in FIG. 10. As shown in the figure, an internal portion of the data base 14 shown in FIG. 10 is roughly classified into an index data area (left side) and a customer data area (right side).

The index data area is comprised by a plurality of data blocks ("1", "2", ..., "n") as illustrated. The interior of each data block is further sectioned into an execution completion flag, customer's telephone number, call information area, and customer's ID number.

There is a customer data area corresponding to each data block. This is opened by the customer's ID number in each data block.

Note that the memory format in the data base 14 shown in FIG. 3 is almost the same as the memory format in FIG. 15. Note also that there is no call information area in the index data area in the former memory format.

Figure 16:
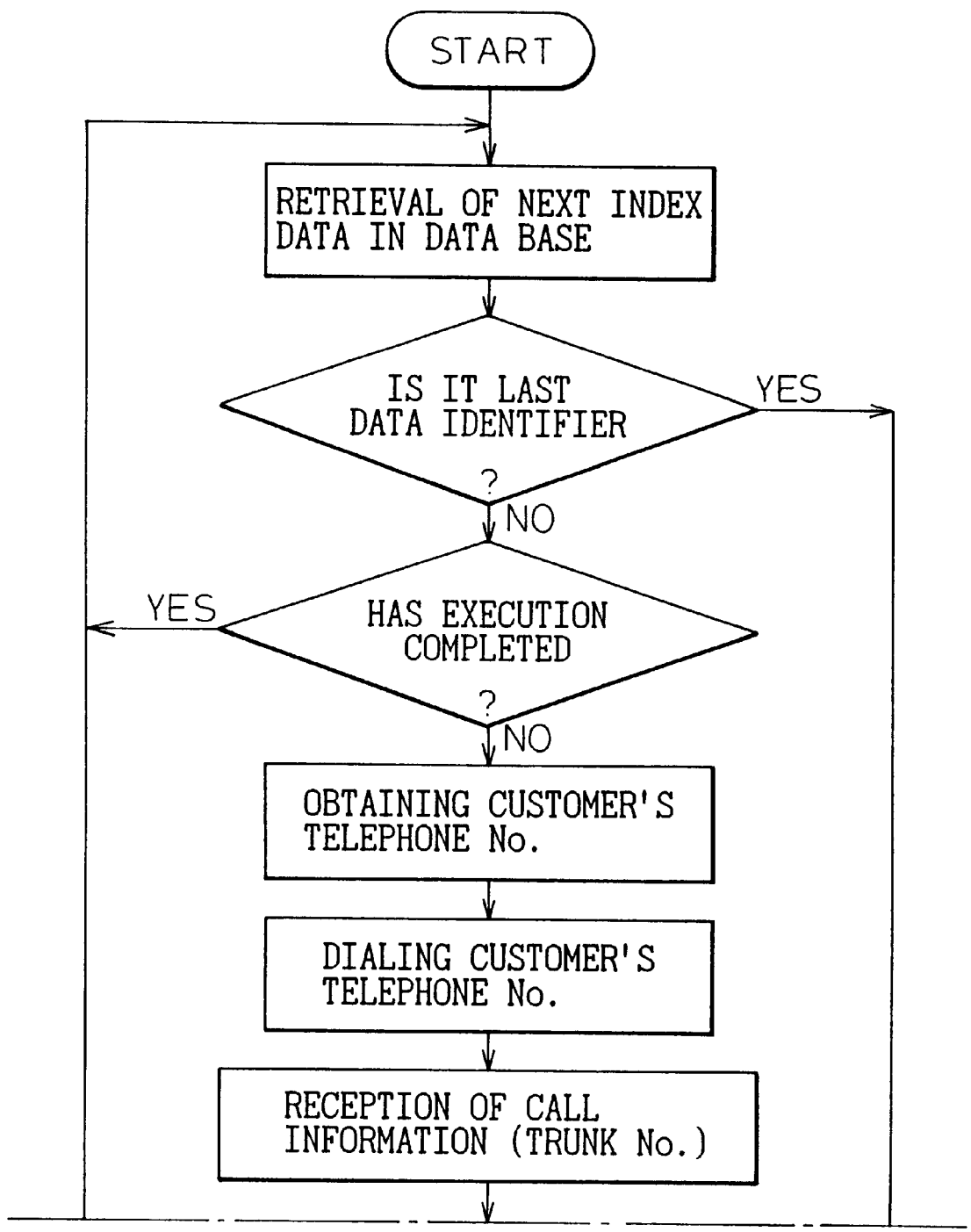
FIG. 16 is a first part of a flow chart of the processing between the data base 14 (FIG. 15) and the originating equipment 12 shown in FIG. 10.
Figure 17:
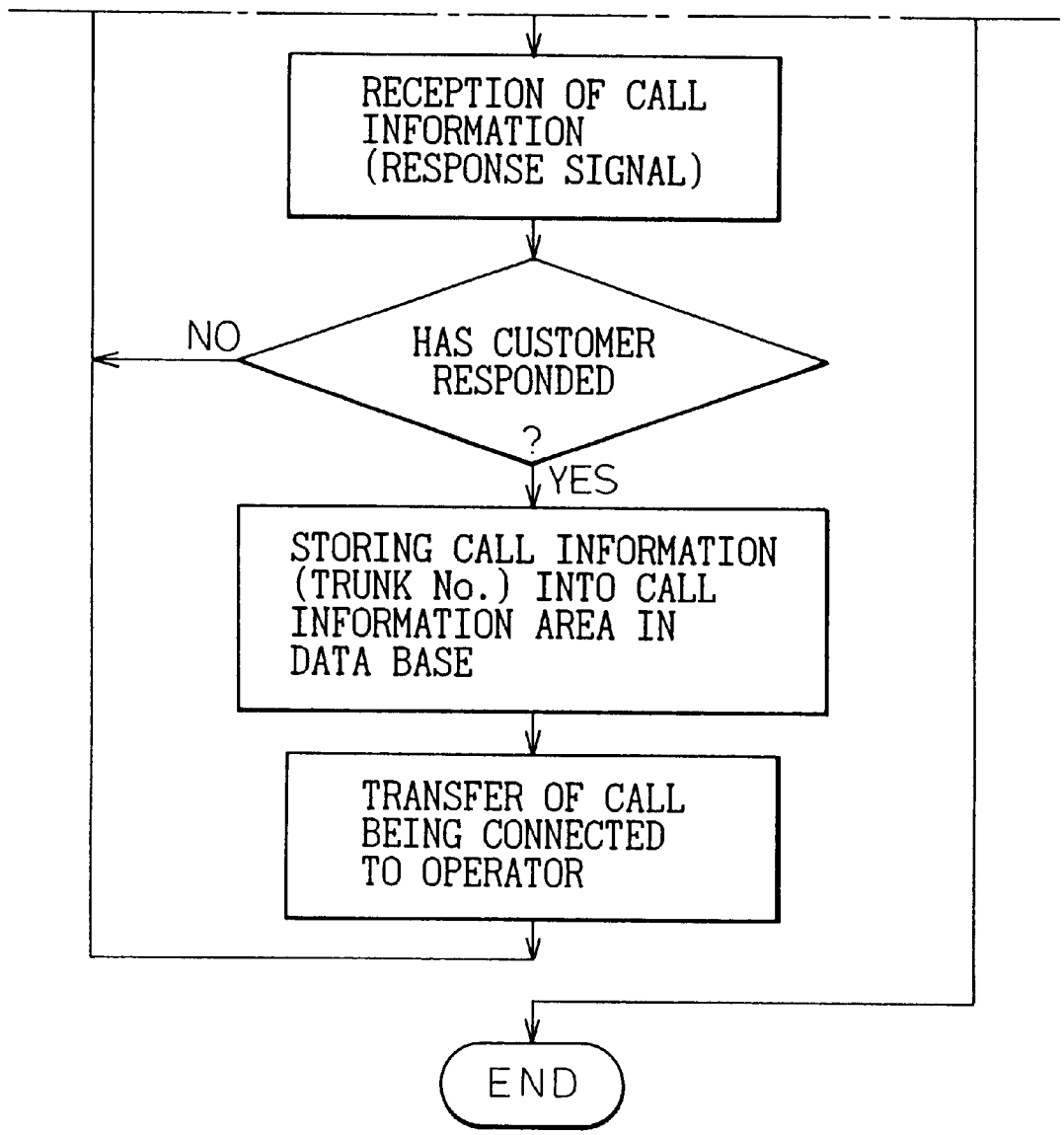
FIG. 17 is a second part of a flow chart of the processing between the data base 14 (FIG. 15) and the originating equipment 12 shown in FIG. 10.

FIG. 16 and FIG. 17 are parts of a flow chart of the processing between the data base 14 and the originating equipment 12 shown in FIG. 10.

The processing shown in FIGS. 16 and 17 may be summarized as follows.

The originating equipment 12 sequentially looks at the area of the index data from the top to find the data block in which the execution completion flag is set. If there is a data block which has been already executed, the customer's telephone number in the data block is taken out. Further, the telephone number is dialed.

When it is notified from the private branch exchange 11 to the originating equipment 12 that the customer responded to the telephone call dialled, the call information (trunk no.) received from the private branch exchange 11 is stored in the call information area shown on the left of FIG. 15. Thereafter, the originating equipment 12 transfers the call in communication to the operator apparatus 13.

Figure 18:
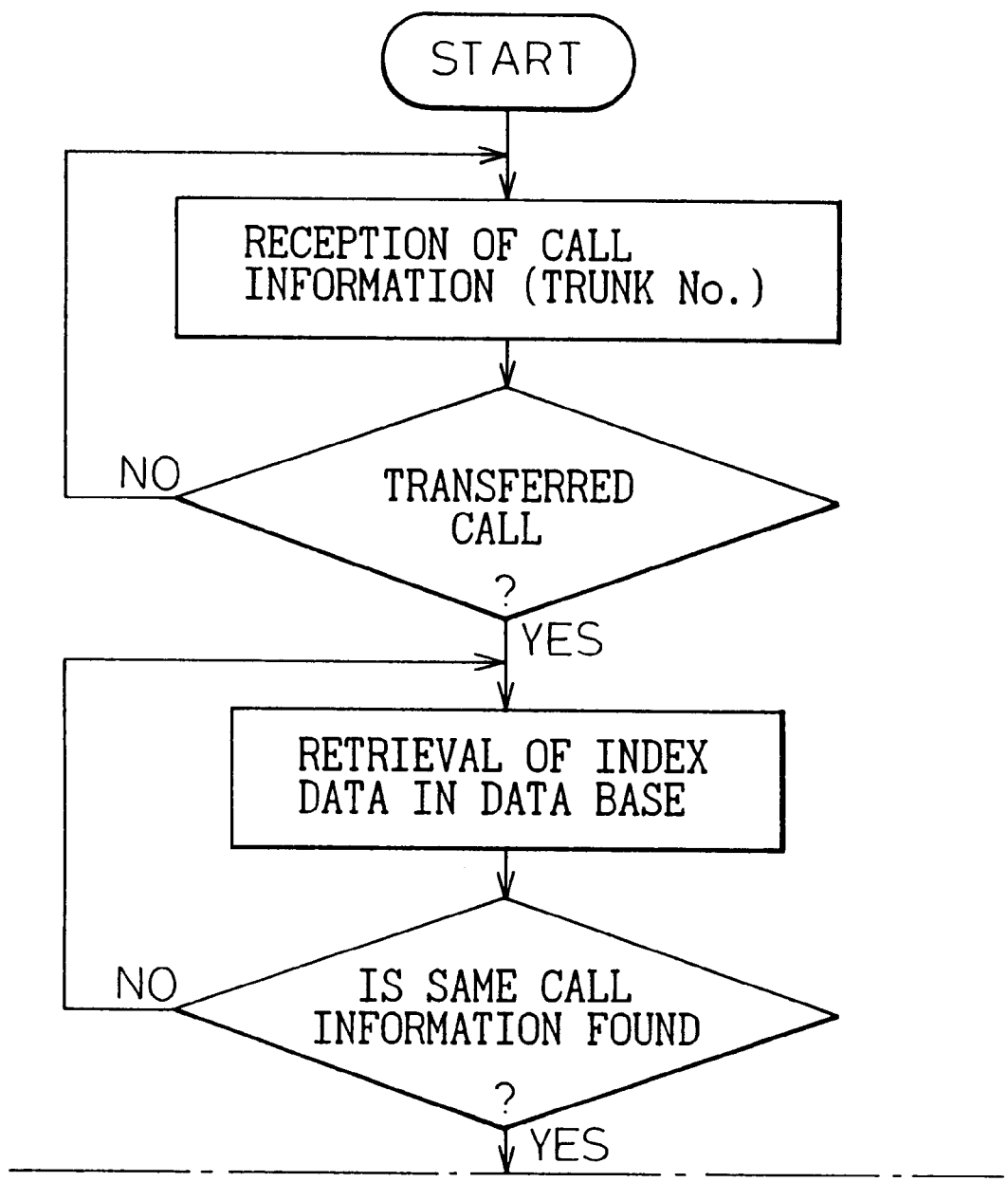
FIG. 18 is a first part of a flow chart of the processing between the data base 14 (FIG. 15) and the operator apparatus 13 shown in FIG. 10.
Figure 19:
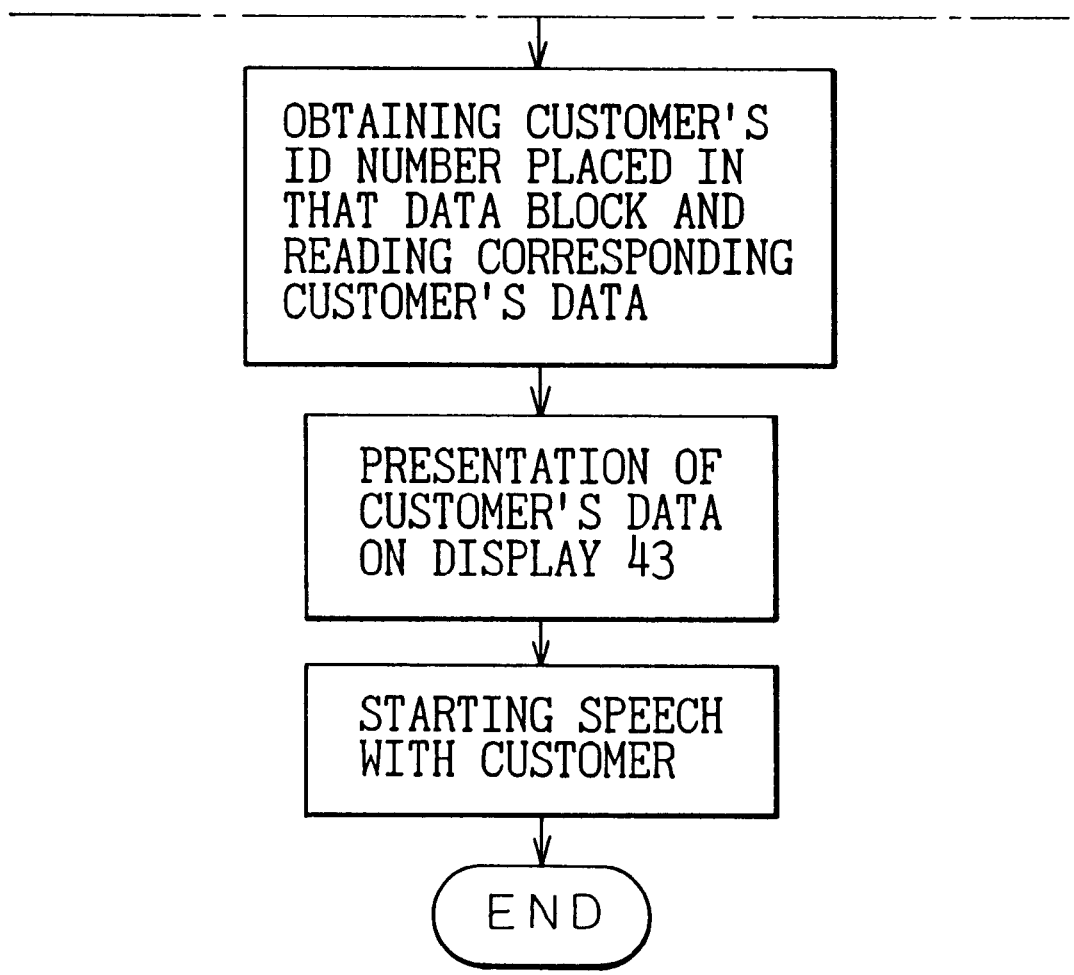
FIG. 19 is a second part of a flow chart of the processing between the data base 14 (FIG. 15) and the operator apparatus 13 shown in FIG. 10.

FIG. 18 and FIG. 19 are parts of a flow chart of the processing between the data base 14 (FIG. 15) and the operator apparatus 13 shown in FIG. 10.

The processing shown in FIG. 18 and FIG. 19 is summarized as follows.

The operator apparatus 13 retrieves the call information area (FIG. 15) in the index data area by the call information (trunk no.) received from the private branch exchange 11. If there is the same call information as the trunk no., the customer's ID number (FIG. 15) in the data block is read, the customer's data (1, 2, ..., n) corresponding to this customer's ID number is taken out of the customer's data area, and this is displayed on the display device 43 in the operator apparatus 13.

In each embodiment mentioned above, the customer's telephone number was used as the customer's ID information obtained from the data base 14, but the present invention is not limited to this. This can be replaced by for example the individual name of the customer too. In this case, at the instruction of call origination to the private branch exchange 11, a translation table capable of translating the individual name to the customer's telephone number is provided on the originating equipment 12 side, and the call origination may be instructed by using the customer's telephone number after the translation.

Further, the originating equipment 12 obtained the list of customers to be called from the data base 14, but the present invention is not limited to this and can obtain a list of called customers through a route other than the data base 14, too.

According to the configuration of the present invention, even if the private branch exchange 11 uses the ACD function, the operator apparatus 13 can identify which called subscriber has the call transferred from the private branch exchange 11 to the operator apparatus 13, therefore the operator can obtain the individual customer information of the called subscriber and thus adequate service to the called subscriber becomes possible. Further, for a special called subscriber such as an important customer, the originating equipment 12 designates a specified extension number when transferring the call to the operator apparatus 13, whereby it becomes possible to transfer this to a particular operator. Thus, better service can be given to each called subscriber.

What is claimed is:

1. An automatic call system comprising at least one storage device, a private branch exchange, originating equipment, and a plurality of operator apparatuses, wherein the private branch exchange operates to originate calls in accordance with call origination instructions from the originating equipment and to notify call information relating to the originated call to the originating equipment and the destination operator apparatus;

the originating equipment operates to store called subscriber ID information such as a customer telephone number in a storage device linked with the call information; and an operator apparatus to which a response from a called subscriber is transferred operates to retrieve, in said storage device, said called subscriber ID information using said call information as a key so as to obtain individual information of said called subscriber.

2. An automatic call system comprising a first and a second storage devices, a private branch exchange, originating equipment, and a plurality of operator apparatuses, wherein:

said first storage device stores individual information of called subscribers, including ID information, for a plurality of called subscribers as a data base;

said originating equipment is provided with a means for obtaining the ID information of a called subscriber to be accessed, a means for instructing call origination to the called subscriber to the private branch exchange based on the ID information, a means for receiving the call information of the private branch exchange relating to the originating call from the private branch exchange, a means for making the second storage device store the ID information relating to the originating call linked with the call information, and a means for instructing the transfer of the call to one of a plurality of operator apparatuses when a response from a called subscriber with respect to an originating call is notified from the private branch exchange;

the private branch exchange is provided with a means for notifying the call information relating to the origination call instructed from the originating equipment to the originating equipment and a means for transferring a call responded to from a called subscriber to one of a plurality of operator apparatuses and for notifying the call information relating to the originating call; and the operator apparatus is provided with a means for obtaining the ID information of a called subscriber from the second storage device by using the call information relating to this call when the call is transferred and a means for obtaining the individual information of a called subscriber from the first storage device by using the fetched ID information.

3. Originating equipment provided with a means for obtaining ID information of a called subscriber to be accessed, a means for instructing call origination to the called subscriber to a private branch exchange based on the ID information, a means for receiving the call information of the private branch exchange relating to the originating call from the private branch exchange, a means for making a second storage device store the ID information relating to the originating call linked with the call information, and a means for instructing the transfer of the call to one of a plurality of operator apparatuses when a response from a called subscriber with respect to an originating call is notified from the private branch exchange.

4. A call center system provided with a means for receiving a call transfer and a call information of the private branch exchange relating to the originating call from the private branch exchange, a means for obtaining the ID information of a called subscriber from a second storage device storing the ID information of the called subscriber relating to the originating call linked with the call information using the call information relating to the originating call when receiving the transfer of said call, and a means for obtaining individual information of said called subscriber from a first storage device storing individual information including the ID information of the called subscriber for a plurality of called subscribers as a data base using the obtained ID information.

5. An automatic call method for distributing a call to one of a plurality of operator apparatuses in an automatic call system comprising a first and a second storage devices, a private branch exchange, originating equipment, and a plurality of operator apparatuses, wherein:

said first storage device stores individual information of called subscribers, including ID information, for a plurality of called subscribers as a data base;

said originating equipment executes a step of obtaining the ID information of a called subscriber to be accessed, a step of instructing call origination to the called subscriber to the private branch exchange based on the ID information, a step of receiving the call information of the private branch exchange relating to the originating call from the private branch exchange, a step of making the second storage device store the ID information relating to the originating call linked with the call information, and a step of instructing the transfer of the call to one of a plurality of operator apparatuses when a response from a called subscriber with respect to an originating call is notified from the private branch exchange;

the private branch exchange executes a step of notifying the connecting terminal information relating to the origination call instructed from the originating equipment to the originating equipment and a step of transferring a call responded to from a called subscriber to one of a plurality of operator apparatuses in accordance with an instruction for transferring a call ordination from the originating equipment and of notifying the call information relating to the termination call; and an operator apparatus executes a step of obtaining the ID information of a called subscriber from the second storage device by using the call information relating to this call when the call is transferred and a step of obtaining the individual information of a called subscriber from the first storage device by using the obtaining ID information.

6. An automatic call system comprising a storage device, a private branch exchange, originating equipment, and a plurality of operator apparatuses, wherein:

said storage device stores individual information, including ID information of called subscribers, for a plurality of called subscribers as a data base;

said originating equipment is provided with a means for obtaining the ID information of a called subscriber to be accessed, a means for instructing call origination to the called subscriber to the private branch exchange based on the ID information, a means for receiving the call information of the private branch exchange relating to the originating call from the private branch exchange, a means for making the storage device store the ID information relating to the originating call linked with the call information, and a means for instructing the transfer of the call to one of a plurality of operator apparatuses when a response from a called subscriber with respect to an originating call is notified from the private branch exchange;

the private branch exchange is provided with a means for notifying the call information relating to the origination call instructed from the originating equipment to the originating equipment and a means for transferring a call responded to from a called subscriber to one of a plurality of operator apparatuses in accordance with an instruction for transferring a call origination from the originating equipment and for notifying the call information relating to the termination call; and an operator apparatus is provided with a means for obtaining the individual information of a called subscriber from the storage device by using the call information relating to this call when the call is transferred.

7. An originating equipment provided with a means for obtaining ID information of a called subscriber to be accessed, a means for instructing call origination to the called subscriber to a private branch exchange based on the ID information, a means for receiving the call information of the private branch exchange relating to the originating call from the private branch exchange, a means for making a storage device store the ID information relating to the originating call linked with the call information, and a means for instructing the transfer of the call to one of a plurality of operator apparatuses when a response from a called subscriber with respect to an originating call is notified from the private branch exchange.

8. A call center system provided with a means for receiving a call transfer and a call information of the private branch exchange relating to the originating call from the private branch exchange and a means for obtaining individual information of a called subscriber from a storage device storing the individual information of the called subscribers for a plurality of called subscribers linked with ID information of the called subscribers relating to the call using the call information relating to the originating call when receiving the transfer of said call.

9. An automatic call method for distributing a call to one of a plurality of operator apparatuses in an automatic call system comprising a storage device, a private branch exchange, originating equipment, and a plurality of operator apparatuses, wherein:

said storage device stores individual information, as a data base, including ID information of called subscribers, for a plurality of called subscribers;

said originating equipment executes a step of obtaining the ID information of a called subscriber to be accessed, a step of instructing call origination to the called subscriber to the private branch exchange based on the ID information, a step of receiving the call information of the private branch exchange relating to the originating call from the private branch exchange, a step of making the storage device store the ID information relating to the originating call linked with the call information, and a step of instructing the transfer of the call to one of a plurality of operator apparatuses when a response from a called subscriber with respect to an originating call is notified from the private branch exchange;

the private branch exchange executes a step of notifying a connecting terminal information relating to the origination call instructed from the originating equipment to the originating equipment and a step of transferring a call responded to from a called subscriber to one of a plurality of operator apparatuses in accordance with an instruction for transferring a call origination from the originating equipment and for notifying the call information relating to the termination call; and the operator apparatus executes a step of obtaining the individual information of a called subscriber from the storage device by using the call information relating to this call when the call is transferred.

* * * * *